US012793057B2

(12) United States Patent
Mu et al.

(10) Patent No.: US 12,793,057 B2
(45) Date of Patent: Nov. 10, 2026

(54) SECURITY CHIP FOR DIGITAL CURRENCY STORAGE, AND APPLICATION METHOD FOR SECURITY CHIP FOR DIGITAL CURRENCY STORAGE

(71) Applicant: Digital Currency Institute, The People's Bank of China, Beijing (CN)

(72) Inventors: Changchun Mu, Beijing (CN); Gang Di, Beijing (CN); Xinyu Zhao, Beijing (CN); Peidong Cui, Beijing (CN); Jianli Yan, Beijing (CN); Peng Yu, Beijing (CN); Wei Liang, Beijing (CN)

(73) Assignee: Digital Currency Institute, The People's Bank of China, Beijing (CN)

( * ) Notice: Subject to any disclaimer, the term of this patent is extended or adjusted under 35 U.S.C. 154(b) by 114 days.

(21) Appl. No.: 18/381,172

(22) Filed: Oct. 18, 2023

(65) Prior Publication Data

US 2024/0062198 A1 Feb. 22, 2024

Related U.S. Application Data

(62) Division of application No. 18/287,177, filed as application No. PCT/CN2022/087234 on Apr. 15, 2022.

(30) Foreign Application Priority Data

Apr. 16, 2021 (CN) ......................... 202110414592.1
Apr. 16, 2021 (CN) ......................... 202110414597.4
Apr. 16, 2021 (CN) ......................... 202110414600.2

(51) Int. Cl.
*G06Q 20/38* (2012.01)
*G06Q 20/06* (2012.01)
(Continued)

(52) U.S. Cl.
CPC ....... *G06Q 20/3829* (2013.01); *G06Q 20/065* (2013.01); *G06Q 20/223* (2013.01);
(Continued)

(58) Field of Classification Search
CPC ........................... G06Q 20/401; G06Q 20/382
See application file for complete search history.

(56) References Cited

U.S. PATENT DOCUMENTS

2002/0184413 A1* 12/2002 Wingen ................ G06F 13/385 710/52
2008/0275813 A1 11/2008 Altberg
(Continued)

FOREIGN PATENT DOCUMENTS

CN 101162535 A 4/2008
CN 106339332 A 1/2017
(Continued)

OTHER PUBLICATIONS

Eldefrawy; Banknote Validation through an Embedded RFID Chip and an NFC-Enabled Smartphone; Mathematical problems in engineering, Jan. 2015, vol. 2015 (2015), p. 1-8.*
(Continued)

*Primary Examiner* — Ilse I Immanuel
(74) *Attorney, Agent, or Firm* — The Sun IP Law

(57) ABSTRACT

A digital currency payment method and system, and an apparatus, a security chip, and an application method, which relate to the technical field of computers. The payment method includes: generating a transaction amount, or acquiring, by means of a communication connection between a first client and a second client, the transaction amount sent by the second client; and sending a payment request to the second client by means of the communication connection, where the payment request indicates a first digital currency corresponding to the transaction amount or a circulation
(Continued)

identifier of the first digital currency, so as to enable a second currency management apparatus corresponding to the second client to cash a second digital currency corresponding to the transaction amount to a first currency management apparatus corresponding to the first client.

6 Claims, 19 Drawing Sheets

(51) Int. Cl.
*G06Q 20/22* (2012.01)
*G06Q 20/40* (2012.01)

(52) U.S. Cl.
CPC ......... *G06Q 20/382* (2013.01); *G06Q 20/401* (2013.01); *G06Q 2220/00* (2013.01)

(56) References Cited

U.S. PATENT DOCUMENTS

| | | | |
|---|---|---|---|
| 2015/0242825 A1 | 8/2015 | Mills | |
| 2017/0103394 A1 | 4/2017 | Colhoun | |
| 2017/0228704 A1 | 8/2017 | Zhou | |
| 2017/0359178 A1 | 12/2017 | Bea | |
| 2018/0053157 A1 | 2/2018 | Roffey | |
| 2019/0034888 A1 | 1/2019 | Grassadonia | |
| 2019/0095907 A1 | 3/2019 | Govindarajan et al. | |
| 2019/0347631 A1 | 11/2019 | Mossoba | |
| 2021/0004800 A1* | 1/2021 | Aggarwal | G06Q 20/405 |
| 2021/0097521 A1 | 4/2021 | Kumar | |
| 2021/0218688 A1* | 7/2021 | Wang | H04L 12/1881 |

FOREIGN PATENT DOCUMENTS

| | | | | |
|---|---|---|---|---|
| CN | 106415611 A | | 2/2017 | |
| CN | 107230049 A | | 10/2017 | |
| CN | 107230050 A | | 10/2017 | |
| CN | 107230055 A | | 10/2017 | |
| CN | 107230070 A | | 10/2017 | |
| CN | 107230074 A | | 10/2017 | |
| CN | 107230076 A | | 10/2017 | |
| CN | 107230077 A | | 10/2017 | |
| CN | 107274185 A | | 10/2017 | |
| CN | 107820238 A | | 3/2018 | |
| CN | 109034793 A | | 12/2018 | |
| CN | 109844787 A | | 6/2019 | |
| CN | 110428252 A | | 11/2019 | |
| CN | 110544090 A | | 12/2019 | |
| CN | 112330310 A | | 2/2021 | |
| CN | 112508556 A | | 3/2021 | |
| EP | 3321839 A1 | * | 5/2018 | G06F 11/3495 |
| WO | 2020168564 A1 | | 8/2020 | |

OTHER PUBLICATIONS

The search report of family EP application No. 23211409.0 issue on Mar. 4, 2024.
ISR for PCT/CN2022/087234 mailed Jul. 18, 2022.
The first office action of counterpart CN application No. 2021104146002 issued on Jun. 18, 2025.
The first office action of counterpart U.S. Appl. No. 18/381,171 issued on Jul. 10, 2025.
The search report of counterpart EP application No. 22787654.7 issued on Aug. 7, 2024.
The first office action of counterpart CN application No. 202110414597.4 issued on Mar. 20, 2026.
Yao, Q.Research on the application of digital currency in inter-bank fund allocation scenarios . Financial Computerizing. Aug. 8, 2017. https://www.cebnet.com.cn/20170808/102414986.html.
The first search report of counterpart CN application No. 202110414592.1 issued on Mar. 2, 2026.
The Final office action of U.S. Appl. No. 18/381,171 issued on Jan. 13, 2026.
The second office action of priority CN application No. 202110414592.1, issued on Jun. 16, 2026. 34 pages.

* cited by examiner

SECURITY CHIP FOR DIGITAL CURRENCY STORAGE, AND APPLICATION METHOD FOR SECURITY CHIP FOR DIGITAL CURRENCY STORAGE

CROSS-REFERENCE TO RELATED APPLICATION

The disclosure claims priority to Chinese Patent Application No. 202110414597.4 filed on Apr. 16, 2021 and entitled "Digital Currency Payment Method, Apparatus and System", to Chinese Patent Application No. 202110414600.2 filed on Apr. 16, 2021 and entitled "Digital Currency Payment Method, Apparatus and System", and to Chinese Patent Application No. 202110414592.1 filed on Apr. 16, 2021 and entitled "Security Chip, Terminal, and Currency Management Apparatus and Application Method thereof", the disclosures of which are hereby incorporated by reference in their entirety as part or all of the disclosure.

TECHNICAL FIELD

The disclosure relates to the technical field of computers, and in particular, to a digital currency payment method and system, and an apparatus, a security chip, and an application method.

BACKGROUND

In the era of digital economy, because of characteristics of low costs and convenience, digital currencies have received increasing attention from banks as well as consumers in various countries; and using the digital currencies for payments is then the key to realizing the circulation and application of the digital currencies.

The difference between the digital currencies and traditional electronic payments is that: the money used in traditional electronic payments is from bank accounts, which still corresponds in practice to banknotes, while the digital currencies are money in and of themselves, and paying with the digital currencies is paying with money, such that current existing electronic payment schemes cannot adapt to digital currency payments.

SUMMARY

In view of this, embodiments of the disclosure provide a digital currency payment method and system, and an apparatus, a security chip, and an application method, which can realize online payment of a digital currency on the basis of a communication connection between different clients, and are convenient and fast.

In order to achieve the above objective, a first aspect of an embodiment of the disclosure provides a digital currency payment method, which is applied to a first client, and includes the following operations.

A transaction amount is generated, or the transaction amount sent by the second client is acquired by means of a communication connection between a first client and a second client.

A payment request is sent to the second client by means of the communication connection. The payment request indicates a first digital currency corresponding to the transaction amount or a circulation identifier of the first digital currency, so as to enable a second currency management apparatus corresponding to the second client to cash a second digital currency corresponding to the transaction amount to a first currency management apparatus corresponding to the first client.

As at least one alternative embodiment, before the transaction amount is generated, or the transaction amount sent by the second client is acquired by means of the communication connection between the first client and the second client, the method further includes: establishing the communication connection between the first client and the second client.

After the transaction amount is generated, or the transaction amount sent by the second client is acquired by means of the communication connection between the first client and the second client, and before the payment request is sent to the second client by means of the communication connection, the method further includes the following operation.

When the communication connection is disconnected, the communication connection between the first client and the second client is re-established.

As at least one alternative embodiment, when the communication connection is disconnected, the communication connection between the first client and the second client is re-established on the basis of one or more of the following: a transaction identifier, the transaction amount, a time stamp, a transaction counter, a transaction statement, first client information, and second client information.

As at least one alternative embodiment, the digital currency payment method further includes the following operation.

Before the payment request is sent to the second client by means of the communication connection, whether the transaction amount is greater than a threshold amount is determined, and when the transaction amount is greater than the threshold amount, a payment code corresponding to the transaction amount is acquired.

When the transaction amount is greater than the threshold amount, the payment request further indicates the payment code.

As at least one alternative embodiment, the digital currency payment method further includes the following operation.

A digital currency exporting request is sent to the first currency management apparatus. The digital currency exporting request indicates the transaction amount, so as to enable the first currency management apparatus to generate the first digital currency corresponding to the transaction amount.

According to a second aspect, an embodiment of the disclosure provides a digital currency payment method, which is applied to a first currency management apparatus, and includes the following operations.

A digital currency exporting request sent by a first client is received. The digital currency exporting request indicates a transaction amount.

A first digital currency corresponding to the transaction amount is generated.

The first digital currency or a circulation identifier of the first digital currency is issued to the first client.

As at least one alternative embodiment, the first digital currency or the circulation identifier is verified when the first digital currency or the circulation identifier sent by a second currency management apparatus corresponding to a second client is received.

A verification result of the first digital currency or the circulation identifier is sent to the second currency management apparatus.

A digital currency record corresponding to the first client is updated when verification of the first digital currency or the circulation identifier is passed.

As at least one alternative embodiment, the operation of verifying the first digital currency or the circulation identifier includes the following operation.

The first digital currency or the circulation identifier is verified according to the digital currency record corresponding to the first client.

As at least one alternative embodiment, the digital currency payment method in the embodiment of the second aspect further includes the following operations.

When the transaction amount is greater than a threshold amount, a payment code, which is sent by the second currency management apparatus corresponding to the second client, corresponding to the transaction amount is received.

The payment code is verified according to the digital currency record corresponding to the first client.

According to a third aspect, an embodiment of the disclosure provides a digital currency payment method, which is applied to a second client, and includes the following operations.

A payment request sent by the first client is received by means of a communication connection between a first client and a second client. The payment request indicates a first digital currency corresponding to a transaction amount or a circulation identifier of the first digital currency.

A digital currency cashing request is sent to a second currency management apparatus corresponding to the second client. The digital currency cashing request indicates the first digital currency or the circulation identifier, so as to enable the second currency management apparatus to cash a second digital currency corresponding to the transaction amount to a first currency management apparatus corresponding to the first client.

As at least one alternative embodiment, before the payment request sent by the first client is received, the method further includes: establishing the communication connection between the first client and the second client.

After the payment request sent by the first client is received, and before the digital currency cashing request is sent to the second currency management apparatus corresponding to the second client, the method further includes: re-establishing a communication connection between the first client and the second client when the communication connection between the first client and the second client is disconnected.

As at least one alternative embodiment, the digital currency payment method in the embodiment of the third aspect further includes the following operation.

The transaction amount is generated, and the transaction amount is sent to the first client by means of the communication connection between the first client and the second client, so as to enable the first client to acquire the payment code corresponding to the transaction amount when the transaction amount is greater than a threshold amount.

As at least one alternative embodiment, when the transaction amount is greater than a threshold amount, the payment request further indicates a payment code corresponding to the transaction amount.

The digital currency cashing request is sent to the second currency management apparatus corresponding to the second client, and the digital currency cashing request further indicates the payment code.

As at least one alternative embodiment, when the communication connection is disconnected, the communication connection between the first client and the second client is re-established on the basis of one or more of the following: a transaction identifier, the transaction amount, a time stamp, a transaction counter, a transaction statement, first client information, and second client information.

According to a fourth aspect, an embodiment of the disclosure provides a digital currency payment method, which is applied to a second currency management apparatus, and includes the following operations.

A digital currency cashing request sent by a second client is received. The digital currency cashing request indicates a first digital currency, which is sent by a first client, corresponding to a transaction amount, or the first digital currency for payments, or a circulation identifier of the first digital currency.

The first digital currency or the circulation identifier is sent to a first currency management apparatus corresponding to the first client, so as to enable the first currency management apparatus to verify the first digital currency or the circulation identifier.

A verification result of the first digital currency or the circulation identifier sent by the first currency management apparatus is received.

When verification of the first digital currency or the circulation identifier is passed, a second digital currency corresponding to the transaction amount is generated, and a digital currency record corresponding to the second client is updated.

As at least one alternative embodiment, the digital currency payment method in the embodiment of the fourth aspect further includes the following operation.

When the transaction amount is greater than a threshold amount, the digital currency cashing request further indicates a payment code corresponding to the transaction amount, the payment code is sent to the first currency management apparatus, so as to receive a verification result of the payment code.

According to a fifth aspect, an embodiment of the disclosure provides a first client for digital currency payment. The first client includes: a transaction amount acquisition module and a payment request sending module.

The transaction amount acquisition module is configured to generate a transaction amount, or acquire, by means of a communication connection between a first client and a second client, the transaction amount sent by the second client.

The payment request sending module is configured to send a payment request to the second client by means of the communication connection. The payment request indicates a first digital currency corresponding to the transaction amount or a circulation identifier of the first digital currency, so as to enable a second currency management apparatus corresponding to the second client to cash a second digital currency corresponding to the transaction amount to a first currency management apparatus corresponding to the first client.

As at least one alternative embodiment, the first client for digital currency payment in the embodiment of the fifth aspect further includes a communication connection establishment module.

The communication connection establishment module is configured to establish the communication connection between the first client and the second client on the basis of any one of the following: a Wireless Local Area Network (WLAN), a Near Field Communication (NFC), and Bluetooth.

As at least one alternative embodiment, the first client for digital currency payment in the embodiment of the fifth aspect further includes a communication connection establishment module.

The communication connection establishment module is configured to: establish the communication connection between the first client and the second client; and when the communication connection is disconnected, re-establish the communication connection between the first client and the second client.

According to a sixth aspect, an embodiment of the disclosure provides a first currency management apparatus for digital currency payment. The first currency management apparatus includes: an exporting request receiving module, a digital currency generation module, and a digital currency issuing module.

The exporting request receiving module is configured to receive a digital currency exporting request sent by a first client. The digital currency exporting request indicates a transaction amount.

The digital currency generation module is configured to generate a first digital currency corresponding to the transaction amount.

The digital currency issuing module is configured to issue the first digital currency or a circulation identifier of the first digital currency to the first client.

According to a seventh aspect, an embodiment of the disclosure provides a second client for digital currency payment. The second client includes: a payment request receiving module and a digital currency cashing module.

The payment request receiving module is configured to receive, by means of a communication connection between a first client and a second client, a payment request sent by the first client. The payment request indicates a first digital currency corresponding to a transaction amount or a circulation identifier of the first digital currency.

The digital currency cashing module is configured to send a digital currency cashing request to a second currency management apparatus corresponding to the second client. The digital currency cashing request indicates the first digital currency or the circulation identifier, so as to enable the second currency management apparatus to cash a second digital currency corresponding to the transaction amount to a first currency management apparatus corresponding to the first client.

According to an eighth aspect, an embodiment of the disclosure provides a second client for digital currency payment. The second client includes: a communication connection establishment module, a payment request receiving module, and a paying request sending module.

The communication connection establishment module is configured to establish a communication connection between a first client and the second client.

The communication connection establishment module is further configured to re-establish the communication connection between the first client and the second client when the communication connection between the first client and the second client is disconnected.

The payment request receiving module is configured to receive a payment request, which is sent by the first client by means of the communication connection. The payment request indicates a first digital currency for payments or a circulation identifier of the first digital currency.

The paying request sending module is configured to send a digital currency cashing request to a second currency management apparatus corresponding to the second client. The digital currency cashing request indicates the first digital currency or the circulation identifier, so as to enable the second currency management apparatus to cash a second digital currency corresponding to the first digital currency to a first currency management apparatus corresponding to the first client.

According to a ninth aspect, an embodiment of the disclosure provides a second currency management apparatus for digital currency payment. The second currency management apparatus includes: a paying request receiving module, a digital currency sending module, a verification result receiving module, and a digital currency generation module.

The paying request receiving module is configured to receive a digital currency cashing request sent by a second client. The digital currency cashing request indicates a first digital currency, which is sent by a first client, corresponding to a transaction amount or a circulation identifier of the first digital currency.

The digital currency sending module is configured to send the first digital currency or the circulation identifier to a first currency management apparatus corresponding to the first client, so as to enable the first currency management apparatus to verify the first digital currency or the circulation identifier.

The verification result receiving module is configured to receive a verification result of the first digital currency or the circulation identifier sent by the first currency management apparatus.

The digital currency generation module is configured to, when verification of the first digital currency or the circulation identifier is passed, generate a second digital currency corresponding to the transaction amount, and update a digital currency record corresponding to the second client.

According to a tenth aspect, an embodiment of the disclosure provides a digital currency payment system, which includes: a first client, a second client, a first currency management apparatus corresponding to the first client, and a second currency management apparatus corresponding to the second client.

The first client is configured to generate a transaction amount or acquire, by means of a communication connection between the first client and the second client, the transaction amount sent by the second client, and send a payment request to the second client by means of the communication connection. The payment request indicates a first digital currency corresponding to a transaction amount or a circulation identifier of the first digital currency.

The second client is configured to receive, by means of the communication connection between the first client and the second client, the payment request sent by the first client, and send a digital currency cashing request to the second currency management apparatus corresponding to the second client. The digital currency cashing request indicates the first digital currency or the circulation identifier.

The first currency management apparatus is configured to: receive a digital currency exporting request sent by the first client, where the digital currency exporting request indicates the transaction amount; generate the first digital currency corresponding to the transaction amount; and issue the first digital currency or the circulation identifier of the first digital currency to the first client.

The second currency management apparatus is configured to receive the digital currency cashing request sent by the second client, and cash a second digital currency corresponding to the transaction amount to the first currency management apparatus corresponding to the first client.

As at least one alternative embodiment, the first client is further configured to: establish the communication connection between the first client and the second client; and when the communication connection is disconnected, re-establish the communication connection between the first client and the second client.

The second client is configured to: establish the communication connection between the first client and the second client; and when the communication connection is disconnected, re-establish the communication connection between the first client and the second client.

The second currency management apparatus is further configured to cash a second digital currency corresponding to the first digital currency to the first currency management apparatus corresponding to the first client.

According to an eleventh aspect, an embodiment of the disclosure provides a digital currency payment method, which is applied to a first client, and includes the following operations.

A transaction amount is generated, or the transaction amount sent by the second client is acquired by means of a communication connection between a first client and a second client.

A digital currency corresponding to the transaction amount is signed.

A payment request is sent to the second client by means of the communication connection. The payment request indicates the digital currency corresponding to the transaction amount and signature information of the first client.

A digital currency corresponding to the first client is updated according to the transaction amount.

As at least one alternative embodiment, the digital currency payment method provided in the embodiment of the eleventh aspect further includes: establishing the communication connection between the first client and the second client.

After the digital currency corresponding to the transaction amount is signed, the method further includes the following operation.

When the communication connection is disconnected, the communication connection between the first client and the second client is re-established.

As at least one alternative embodiment, the digital currency payment method in the embodiment of the eleventh aspect further includes the following operation.

Whether the transaction amount is greater than a threshold amount is determined, and when the transaction amount is greater than the threshold amount, a payment code corresponding to the transaction amount is acquired.

When the transaction amount is greater than the threshold amount, the payment request further indicates the payment code.

According to a twelfth aspect, an embodiment of the disclosure provides a digital currency payment method, which is applied to a second client, and includes the following operations.

A payment request sent by the first client is received by means of a communication connection between a first client and a second client. The payment request indicates a digital currency corresponding to a transaction amount and signature information of the first client.

The signature information of the first client is verified, and a digital currency of the second client is updated according to the transaction amount when verification is passed.

As at least one alternative embodiment, the digital currency payment method in the embodiment of the twelfth aspect further includes the following operations.

A communication connection between a first client and a second client is established.

When the communication connection is disconnected, the communication connection between the first client and the second client is re-established.

As at least one alternative embodiment, the digital currency payment method in the embodiment of the twelfth aspect further includes the following operation.

Before the payment request sent by the first client is received by means of the communication connection between the first client and the second client, the transaction amount is generated, and the transaction amount is sent to the first client by means of the communication connection.

As at least one alternative embodiment, when the transaction amount is greater than a threshold amount, the payment request further indicates a payment code corresponding to the transaction amount.

The payment code is verified, so as to update the digital currency corresponding to the second client according to the digital currency corresponding to the transaction amount when verification is passed.

According to a thirteenth aspect, an embodiment of the disclosure provides a first client for digital currency payment. The first client includes: a transaction amount acquisition module, a digital currency signature module, a payment request sending module, and a digital currency update module.

The transaction amount acquisition module is configured to generate a transaction amount, or acquire, by means of a communication connection between a first client and a second client, the transaction amount sent by the second client.

The digital currency signature module is configured to sign a digital currency corresponding to the transaction amount.

The payment request sending module is configured to send a payment request to the second client by means of the communication connection. The payment request indicates the digital currency corresponding to the transaction amount and signature information of the first client.

The digital currency update module is configured to update, according to the transaction amount, a digital currency corresponding to the first client.

According to a fourteenth aspect, an embodiment of the disclosure provides a second client for digital currency payment. The second client includes: a payment request receiving module and a signature information verification module.

The payment request receiving module is configured to receive, by means of a communication connection between a first client and a second client, a payment request sent by the first client. The payment request indicates a digital currency corresponding to a transaction amount and signature information of the first client.

The signature information verification module is configured to verify the signature information of the first client, and update a digital currency of the second client according to the transaction amount when verification is passed.

According to a fifteenth aspect, an embodiment of the disclosure provides a digital currency payment system, which includes: a first client and a second client.

The first client is configured to: generate a transaction amount or acquire, by means of a communication connection between the first client and the second client, the transaction amount sent by the second client; sign a digital currency corresponding to the transaction amount; send a payment request to the second client by means of the communication connection, where the payment request indicates the digital currency corresponding to the transaction amount and signature information of the first client; and update, according to the transaction amount, a digital currency corresponding to the first client.

The second client is configured to: receive, by means of the communication connection between the first client and the second client, the payment request sent by the first client, where the payment request indicates the digital currency corresponding to the transaction amount and the signature information of the first client; and verify the signature information of the first client, and update a digital currency of the second client according to the transaction amount when verification is passed.

According to a sixteenth aspect, an embodiment of the disclosure provides a security chip for digital currency storage. The security chip includes a storage module and a first communication module.

The storage module is configured to store confidential information related to a digital currency.

The first communication module is configured to, when an information request sent by an application or a terminal is received, send the confidential information to the application or the terminal according to the information request. The application or the terminal is an application or a terminal that uses the digital currency for transaction.

As at least one alternative embodiment, the confidential information includes any one or more of the following: a private key and a public key of a first user corresponding to the terminal, a public key of a second user specified by the first user, a public key of a currency management apparatus, a digital currency, identifier information of the digital currency, a transaction frequency threshold of the digital currency, an offline duration threshold of the digital currency, a payment key of the first user, a payment limit of the first user, state information of the application, identifier information of the application, and identifier information of the terminal.

As at least one alternative embodiment, the storage module is configured to determine a storage state of the confidential information according to a confidentiality level of the confidential information, and store the confidential information according to the storage state. The storage state indicates whether the confidential information is visible to a user.

As at least one alternative embodiment, when an available storage space of the security chip is less than a preset threshold, the first communication module is configured to send prompt information about updating the digital currency online and/or limiting a transaction frequency to the application or the terminal.

According to a seventeenth aspect, an embodiment of the disclosure provides a first terminal for digital currency storage. The first terminal includes an application using a digital currency for transaction, and the security chip provided in the sixteenth aspect.

The security chip is configured to store confidential information related to the digital currency.

The application is configured to send an information request to the security chip when a transaction request related to the digital currency is received, so as to acquire, from the security chip according to the information request, the confidential information related to the digital currency.

As at least one alternative embodiment, the security chip is provided in the first terminal in the form of an all terminal, a Subscriber Identity Module (SIM) card, a Secure Digital (SD) card, an Integrated Circuit (IC) chip, a Standard Image Format (SIF) or Pilot Symbol Assisted Modulation (PSAM) card.

As at least one alternative embodiment, the application is further configured to verify the transaction request according to the confidential information, and determine, according to a verification result, whether to execute a transaction corresponding to the transaction request.

As at least one alternative embodiment, the first terminal provided in the seventeenth aspect further includes an application.

The application being further configured to encrypt, according to the confidential information, transaction information indicated by the transaction request, and send the encrypted transaction information to a second terminal indicated by the transaction request.

As at least one alternative embodiment, the first terminal provided in the seventeenth aspect further includes a processing module.

The processing module is configured to: receive a confidentiality level of information related to the digital currency and sent by a currency management apparatus; and according to the confidentiality level, determine, from the information, the confidential information that is storable in the security chip, and store the confidential information in the security chip.

As at least one alternative embodiment, the processing module is further configured to determine a security level of the security chip, and determine, according to the security level, a transaction amount threshold related to the digital currency.

According to an eighteenth aspect, an embodiment of the disclosure provides a currency management apparatus for digital currency storage. The currency management apparatus includes a level determination module and a second communication module.

The level determination module is configured to determine a confidentiality level of information related to a digital currency.

The second communication module is configured to send the information and the confidentiality level of the information to a terminal using the digital currency for transaction, so as to enable the terminal to determine confidential information according to the confidentiality level of the information, and store the confidential information into a security chip of the terminal.

According to a nineteenth aspect, an embodiment of the disclosure provides an application method for a security chip for digital currency storage. The application method includes the following operations.

Confidential information related to a digital currency is stored.

When an information request sent by an application or a terminal is received, the confidential information is sent to the application or the terminal according to the information request. The application or the terminal is an application or a terminal that uses the digital currency for transaction.

As at least one alternative embodiment, the operation of storing the confidential information related to the digital currency includes the following operations.

A storage state of the confidential information is determined according to a confidentiality level of the confidential information.

The confidential information is stored according to the storage state. The storage state indicates whether the confidential information is visible to a user.

As at least one alternative embodiment, the confidential information includes any one or more of the following: a private key and a public key of a first user corresponding to the terminal, a public key of a second user specified by the first user, a public key of a currency management apparatus, a digital currency, identifier information of the digital currency, a transaction frequency threshold of the digital currency, an offline duration threshold of the digital currency, a payment key of the first user, a payment limit of the first user, state information of the application, identifier information of the application, and identifier information of the terminal.

As at least one alternative embodiment, when an available storage space of the security chip is less than a preset threshold, prompt information about updating the digital currency online and/or limiting a transaction frequency is sent to the application or the terminal.

According to a twentieth aspect, an embodiment of the disclosure provides an application method for a first terminal for digital currency storage. The application method includes the following operations.

Confidential information related to a digital currency is stored by using a security chip.

An information request is sent to the security chip when a transaction request related to the digital currency is received, so as to acquire, from the security chip according to the information request, the confidential information related to the digital currency.

As at least one alternative embodiment, the operation of storing the confidential information related to the digital currency by using the security chip includes the following operations.

A confidentiality level of information related to the digital currency and sent by a currency management apparatus is received.

According to the confidentiality level, the confidential information that is storable in the security chip is determined from the information, and the confidential information is stored in the security chip.

The disclosure has the following advantages or beneficial effects. The first digital currency for payments or the identifier of the first digital currency is transferred by means of the communication connection between the first client and the second client, so as to enable the second client to cash the second digital currency corresponding to the first digital currency to the second currency management apparatus corresponding to the second client, such that online payment of the digital currency and circulation between different clients are realized, and the disclosure is convenient and fast.

Further effects of non-customary optional methods are described below in combination with specific implementations.

BRIEF DESCRIPTION OF THE DRAWINGS

Drawings are used to better understand the disclosure, and are not intended to improperly limit the disclosure.

DETAILED DESCRIPTION OF THE EMBODIMENTS

Exemplary embodiments of the disclosure are described in detail below with reference to the drawings, including various details of the embodiments of the disclosure to facilitate understanding, and should be regarded as merely exemplary. Thus, those of ordinary skill in the art shall understand that, variations and modifications can be made on the embodiments described herein, without departing from the scope and spirit of the disclosure. Likewise, for clarity and conciseness, descriptions of well-known functions and structures are omitted in the following description.

Figure 1:
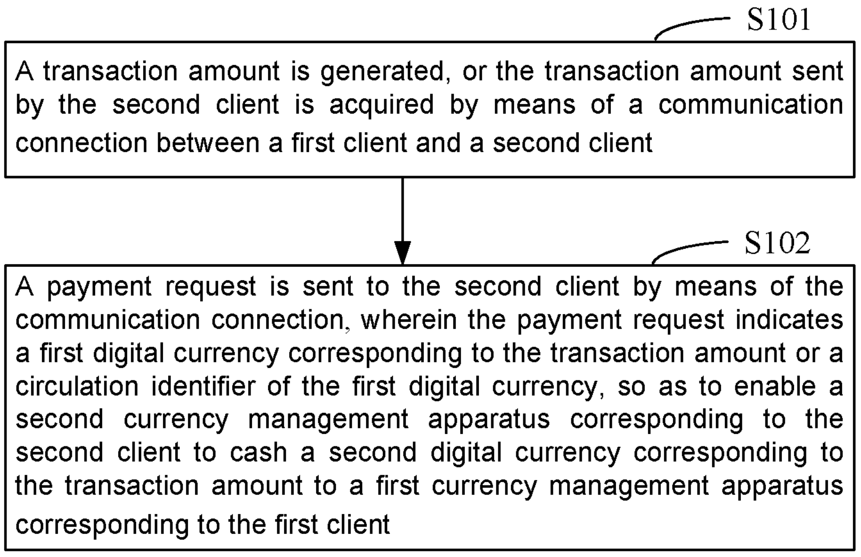
FIG. 1 is a schematic diagram of main processes of a digital currency payment method applied to a first client according to an embodiment of the disclosure.

FIG. 1 is a schematic diagram of main processes of a digital currency payment method applied to a first client according to an embodiment of the disclosure. As shown in FIG. 1, the digital currency payment method may specifically include the following steps.

At S101, a transaction amount is generated, or the transaction amount sent by the second client is acquired by means of a communication connection between a first client and a second client.

Digital currencies refer to currencies that may be used to replace paper currencies for various circulation operations. For example, the digital currencies are used for payments, the transferring of digital currency owners, or the digital currencies are directly transferred. As at least one alternative embodiment, the digital currencies include one or more pieces of the following information: a circulation identifier of the digital currency, a currency management apparatus identifier to which the digital currency belongs, and the signature of a currency management apparatus. The circulation identifier of the digital currency refers to a unique circulation identifier (for example, a serial number) corresponding to the digital currency. The circulation identifier may be in the form of a character string, or a two-dimensional code, so as to facilitate the circulation of the digital currency.

A transaction amount may refer to the transaction amount that is generated by a first client according to an amount actually to be paid, or may refer to the transaction amount that is received by the first client and generated by a second client. Therefore, before the transaction amount is sent to a first currency management apparatus, the first client also needs to generate the transaction amount or receive, by means of a communication connection between the first client and the second client, the transaction amount sent by the second client.

When the first client directly generates the transaction amount, the first client sends a digital currency exporting request to the first currency management apparatus. The digital currency exporting request indicates the transaction amount, so as to enable the first currency management apparatus to generate the first digital currency corresponding to the transaction amount. Based on this, when the first digital currency corresponding to the transaction amount or a circulation identifier of the first digital currency issued by the first currency management apparatus is received, the first client establishes a communication connection with the second client, and sends a payment request to the second client by means of the communication connection.

When the second client generates the transaction amount, the second client establishes a communication connection with the first client, and sends the transaction amount to the first client by means of the communication connection. When the transaction amount is received by means of the communication connection, the first client sends the digital currency exporting request to the first currency management apparatus corresponding to the first client, so as to enable the first currency management apparatus to generate the first digital currency corresponding to the transaction amount. Based on this, the first client receives the first digital currency corresponding to the transaction amount or the circulation identifier of the first digital currency issued by the first currency management apparatus, and sends, by means of the established communication connection between the first client and the second client, the payment request sent by the second client.

Further, the first client or the second client establishes the communication connection between the first client and the second client on the basis of any one of the following: a Wireless Local Area Network (WLAN), a Near Field Communication (NFC), and Bluetooth. For example, when the communication connection is established by using the WLAN, both the first client and the second client enable a direct WLAN connection, so as to establish a WLAN point-to-point connection, and transfer the transaction amount and the payment request by means of an interaction protocol. When the communication connection is established by using the NFC, the first client approaches the second client, so as to establish an NFC channel during touching, and transfer the transaction amount and the payment request by means of the NFC channel. When the communication connection is established by using the Bluetooth, both the first client and the second client enable a Bluetooth function, so as to establish the communication connection by means of Bluetooth pairing, and transfer the transaction amount and the payment request by means of the communication connection.

At S102, a payment request is sent to the second client by means of the communication connection. The payment request indicates a first digital currency corresponding to the transaction amount or a circulation identifier of the first digital currency, so as to enable a second currency management apparatus corresponding to the second client to cash a second digital currency corresponding to the transaction amount to a first currency management apparatus corresponding to the first client.

As at least one alternative embodiment, after receiving the payment request sent by the first client, the second client sends a digital currency cashing request to a second currency management apparatus. The digital currency cashing request indicates the first digital currency or the circulation identifier of the first digital currency. Based on this, the second currency management apparatus sends the first digital currency or the circulation identifier of the first digital currency to the first currency management apparatus, so as to enable the first currency management apparatus to verify the first digital currency or the circulation identifier of the first digital currency, and generate a second digital currency corresponding to the transaction amount or the first digital currency when verification of the first digital currency or the circulation identifier of the first digital currency is passed, such that the digital currency is circulated between the first client and the second client.

It is understandable that, after generating the second digital currency, the second currency management apparatus shall update a digital currency record corresponding to the second client, so as to manage the digital currency.

Correspondingly, when the second currency management apparatus has paid the second digital currency, the first currency management apparatus updates a digital currency record corresponding to the first client, so as to realize balance of payments for the total amount of digital currencies during digital currency transaction.

It is worth mentioning that, the currency management apparatuses corresponding to the first client and the second client may be the same or different. In order to monitor a currency circulation between different currency management apparatuses to avoid an illegal transaction between different currency managements, so as to further guarantee the legitimacy and security of the digital currency, and when the first currency management apparatus is different from the second currency management apparatus, the second currency management apparatus sends the first digital currency or the circulation identifier of the first digital currency to the first currency management apparatus by means of a third party currency management apparatus that monitors different currency management apparatuses. In addition, after the first currency management apparatus verifies the first digital currency or the circulation identifier of the first digital currency, the first currency management apparatus also sends a corresponding verification result to the second currency management apparatus by means of the third-party currency management apparatus.

On the basis of the above embodiments, the first digital currency for payments or the identifier of the first digital currency is transferred by means of the communication connection between the first client and the second client, so as to enable the second client to cash the second digital currency corresponding to the first digital currency to the second currency management apparatus corresponding to the second client, such that online payment of the digital currency and circulation between different clients are realized. In addition, it is to be noted that, when the first client directly generates the transaction amount, the first client merely needs to transfer the payment request by means of the communication connection between the first client and the second client, that is, the online payment of the digital currency may be completed merely by establishing the communication connection once, such that the method is convenient and fast.

Figure 2:
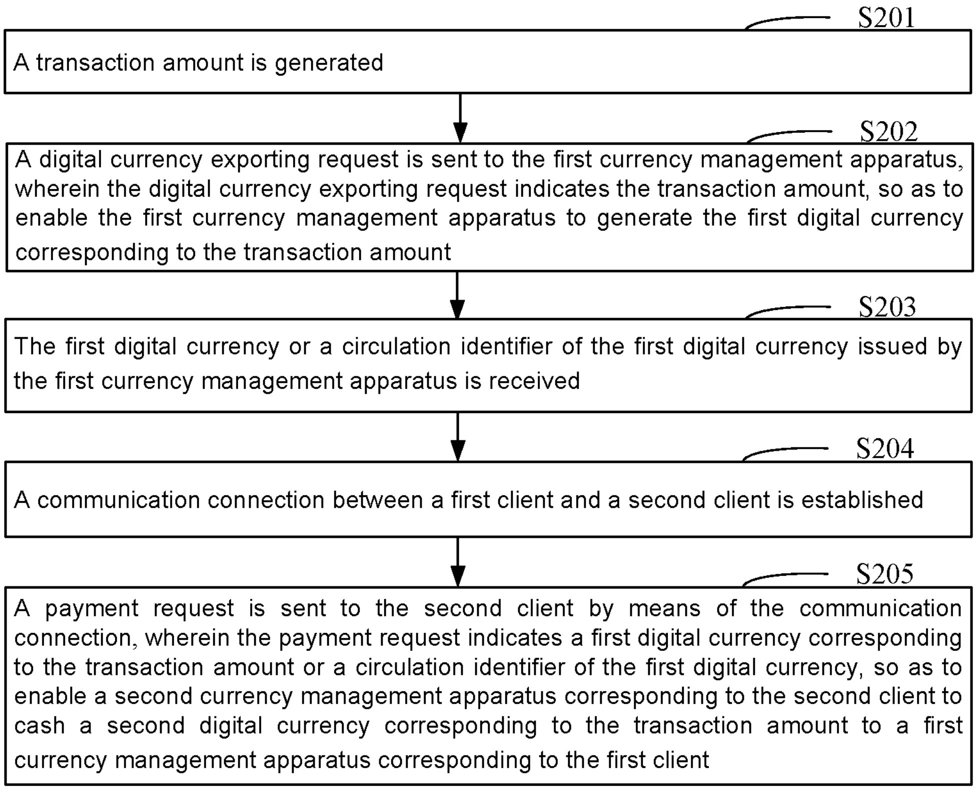
FIG. 2 is a schematic diagram of main processes of another digital currency payment method applied to a first client according to an embodiment of the disclosure.

Referring to FIG. 2, on the basis of the above embodiments, when the first client directly generates the transaction amount, an embodiment of the disclosure provides a digital currency payment method applied to a first client. The method may specifically include the following steps.

At S201, a transaction amount is generated.

At S202, a digital currency exporting request is sent to the first currency management apparatus. The digital currency exporting request indicates the transaction amount, so as to enable the first currency management apparatus to generate the first digital currency corresponding to the transaction amount. It is understandable that, when generating the first digital currency, the first currency management apparatus needs to update a digital currency record corresponding to the first client, so as to manage a digital currency.

At S203, the first digital currency or a circulation identifier of the first digital currency issued by the first currency management apparatus is received.

At S204, a communication connection between a first client and a second client is established. For example, the communication connection between the first client and the second client may be established by using any one of a WLAN, an NFC, and Bluetooth.

At S205, a payment request is sent to the second client by means of the communication connection. The payment request indicates a first digital currency corresponding to the transaction amount or a circulation identifier of the first digital currency, so as to enable a second currency management apparatus corresponding to the second client to cash a second digital currency corresponding to the transaction amount to a first currency management apparatus corresponding to the first client. Therefore, a payment request merely needs to be transferred by means of the communication connection between the first client and the second client, that is, the online payment of the digital currency may be completed merely by establishing the communication connection once, such that the method is convenient and fast.

Figure 3:
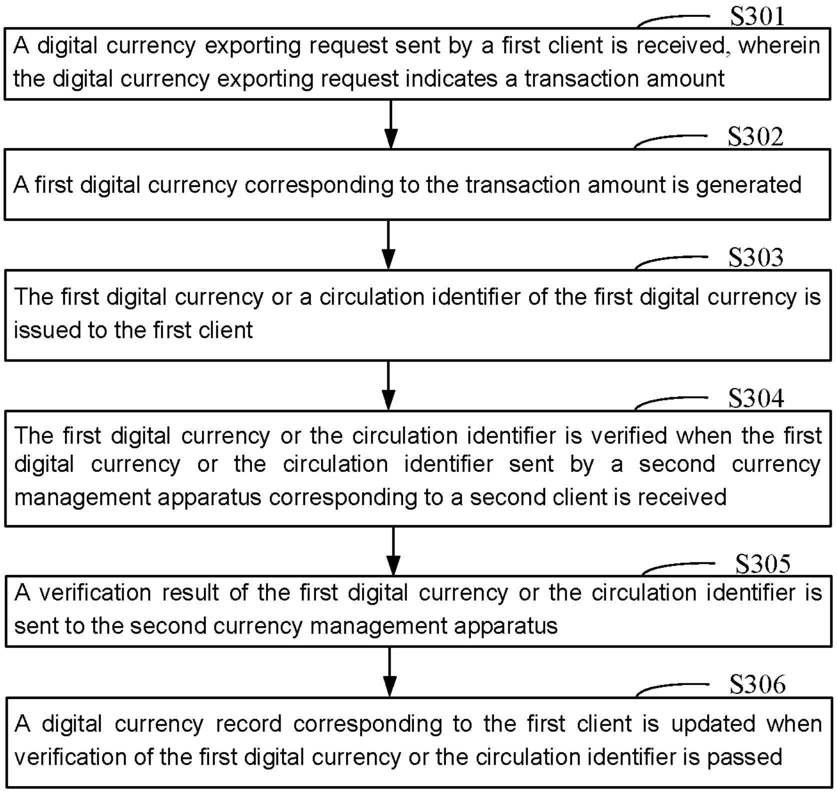
FIG. 3 is a schematic diagram of main processes of a digital currency payment method applied to a first currency management apparatus according to an embodiment of the disclosure.

Referring to FIG. 3, on the basis of the above embodiments, an embodiment of the disclosure provides a digital currency payment method applied to a first currency management apparatus. The method may specifically include the following steps.

At S301, a digital currency exporting request sent by a first client is received. The digital currency exporting request indicates a transaction amount.

The transaction amount may be directly generated by the first client according to actual requirements, or may be directly generated by a second client, and is issued to the first client by means of a communication connection between the first client and the second client.

At S302, a first digital currency corresponding to the transaction amount is generated.

After generating the first digital currency, a first currency management apparatus updates a digital currency record corresponding to the first client, so as to realize the unified management of digital currencies.

At S303, the first digital currency or a circulation identifier of the first digital currency is issued to the first client.

At S304, the first digital currency or the circulation identifier is verified when the first digital currency or the circulation identifier sent by a second currency management apparatus corresponding to a second client is received.

As at least one alternative embodiment, when receiving the first digital currency or the circulation identifier of the first digital currency sent by the second currency management apparatus corresponding to the second client, the first currency management apparatus performs the following verifications on the first digital currency or the circulation identifier of the first digital currency according to the digital currency record corresponding to the first client; determining whether the first digital currency or the circulation identifier is the first digital currency that has been recorded or stored, so as to verify the legitimacy of a source of the digital currency; or determining, according to an identifier of the currency management apparatus indicated by the first digital currency, whether the identifier of the currency management apparatus is consistent with the identifier of the first currency management apparatus, and verifying the legitimacy of the source of the digital currency; or performing verification according to the signature of the currency management apparatus included in the first digital currency. For example, the signature of the currency management apparatus is generated by using an asymmetric encryption algorithm, and then the first currency management apparatus may use a private key corresponding to a public key during generation of signature information to decrypt the signature of the currency management apparatus in the first digital currency, so as to verify the reliability of the signature information. Therefore, the legitimacy of the source of the first digital currency may be guaranteed, and the paying security of the digital currency may also be guaranteed.

At S305, a verification result of the first digital currency or the circulation identifier is sent to the second currency management apparatus.

As at least one alternative embodiment, the first currency management apparatus sends the verification result of the first digital currency or the circulation identifier to the second currency management apparatus, so as to enable the second currency management apparatus to generate a second digital currency corresponding to the first digital currency or the transaction amount when verification of the first digital currency or the circulation identifier of the first digital currency is passed, such that the digital currency is circulated between the first client and the second client.

At S306, a digital currency record corresponding to the first client is updated when verification of the first digital currency or the circulation identifier is passed. Therefore, balance of payments for the total amount of digital currencies during digital currency payment may be maintained.

Figure 4:
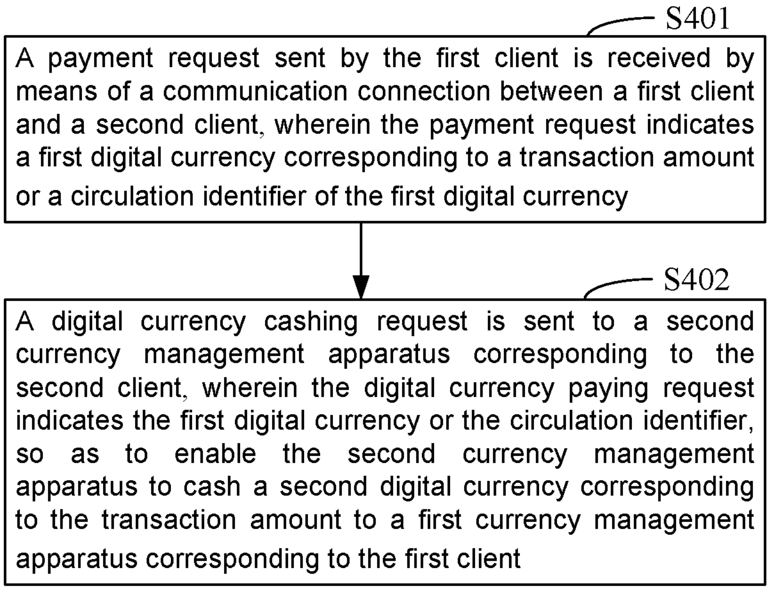
FIG. 4 is a schematic diagram of main processes of a digital currency payment method applied to a second client according to an embodiment of the disclosure.

Referring to FIG. 4, on the basis of the above embodiments, an embodiment of the disclosure provides a digital currency payment method applied to a second client. The method may specifically include the following steps.

At S401, a payment request sent by the first client is received by means of a communication connection between a first client and a second client. The payment request indicates a first digital currency corresponding to a transaction amount or a circulation identifier of the first digital currency.

It is understandable that, the transaction amount may be directly generated by the first client according to actual requirements, or may be directly generated by a second client, and is issued to the first client by means of a communication connection between the first client and the second client.

Before the payment request sent by the first client is received by means of the communication connection between the first client and the second client, the second client also needs to establish the communication connection between the first client and the second client on the basis of any one of the following: a WLAN, an NFC, and Bluetooth.

At S402, a digital currency cashing request is sent to a second currency management apparatus corresponding to the second client. The digital currency cashing request indicates the first digital currency or the circulation identifier, so as to enable the second currency management apparatus to cash a second digital currency corresponding to the transaction amount to a first currency management apparatus corresponding to the first client.

Figure 5:
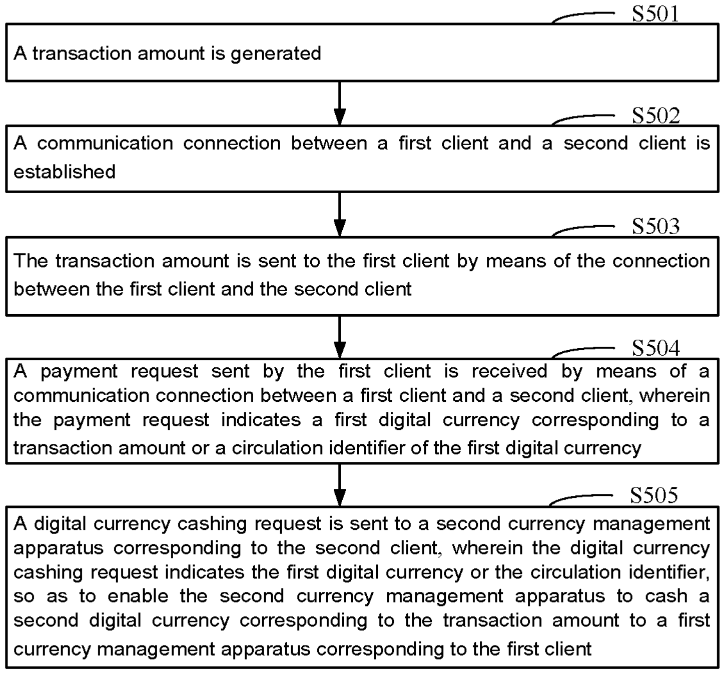
FIG. 5 is a schematic diagram of main processes of another digital currency payment method applied to a second client according to an embodiment of the disclosure.

Referring to FIG. 5, when the second client directly generates the transaction amount, an embodiment of the disclosure provides a digital currency payment method applied to a second client. The method may specifically include the following steps.

At S501, a transaction amount is generated.

At S502, a communication connection between a first client and a second client is established. For example, the communication connection between the first client and the second client is established on the basis of any one of the following: a WLAN, an NFC, and Bluetooth.

At S503, the transaction amount is sent to the first client by means of the connection between the first client and the second client.

After receiving the transaction amount, the first client sends a digital currency exporting request to a first currency management apparatus corresponding to the first client. The digital currency exporting request indicates the transaction amount, so as to enable the first currency management apparatus to generate a first digital currency corresponding to the transaction amount, and issue the first digital currency or a circulation identifier of the first digital currency to the first client.

At S504, a payment request sent by the first client is received by means of a communication connection between a first client and a second client. The payment request indicates a first digital currency corresponding to a transaction amount or a circulation identifier of the first digital currency.

At S505, a digital currency cashing request is sent to a second currency management apparatus corresponding to the second client. The digital currency cashing request indicates the first digital currency or the circulation identifier, so as to enable the second currency management apparatus to cash a second digital currency corresponding to the transaction amount to a first currency management apparatus corresponding to the first client.

Figure 6:
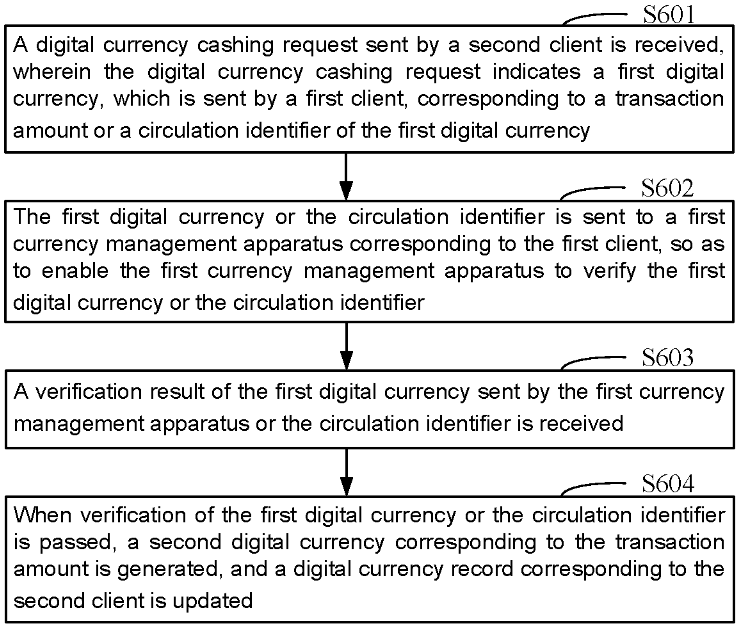
FIG. 6 is a schematic diagram of main processes of a digital currency payment method applied to a second currency management apparatus according to an embodiment of the disclosure.

Referring to FIG. 6, on the basis of the above embodiments, an embodiment of the disclosure provides a digital currency payment method applied to a second currency management apparatus. The method may specifically include the following steps.

At S601, a digital currency cashing request sent by a second client is received. The digital currency cashing request indicates a first digital currency, which is sent by a first client, corresponding to a transaction amount or a circulation identifier of the first digital currency.

At S602, the first digital currency or the circulation identifier is sent to a first currency management apparatus corresponding to the first client, so as to enable the first currency management apparatus to verify the first digital currency or the circulation identifier.

At S603, a verification result of the first digital currency or the circulation identifier sent by the first currency management apparatus is received.

At S604, when verification of the first digital currency or the circulation identifier is passed, a second digital currency corresponding to the transaction amount is generated, and a digital currency record corresponding to the second client is updated.

It is understandable that, when and only when the verification of the first digital currency or the circulation identifier is passed, a second currency management apparatus generates the second digital currency corresponding to the transaction amount or the first digital currency, so as to ensure the security and legitimacy of the digital currency.

Figure 7:
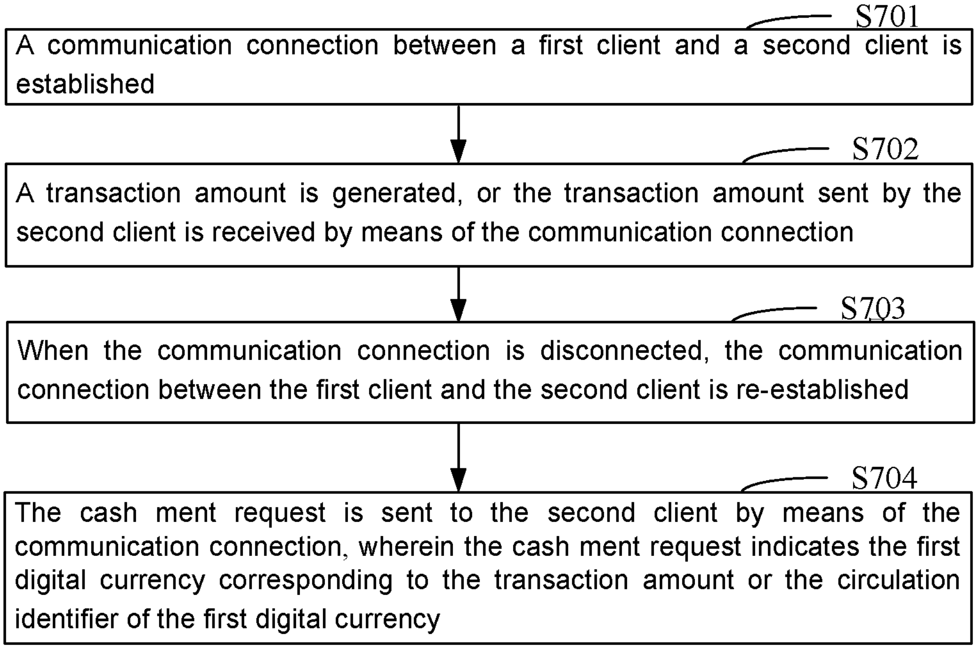
FIG. 7 is a schematic diagram of main processes of a digital currency payment method applied to a first client according to an embodiment of the disclosure.

FIG. 7 is a schematic diagram of main processes of a digital currency payment method applied to a first client according to an embodiment of the disclosure. As shown in FIG. 7, the digital currency payment method may specifically include the following steps.

At S701, a communication connection between a first client and a second client is established.

A digital currency, and a circulation identifier of the digital currency have been described above, and are not described herein again.

The first client or the second client establishes the communication connection between the first client and the second client on the basis of any one of the following: a WLAN, an NFC, and Bluetooth. For example, when the communication connection is established by using the WLAN, both the first client and the second client enable a direct WLAN connection, so as to establish a WLAN point-to-point connection, and transfer the transaction amount and the payment request by means of an interaction protocol. When the communication connection is established by using the NFC, the first client approaches the second client, so as to establish an NFC channel during touching, and transfer the transaction amount and the payment request by means of the NFC channel. When the communication connection is established by using the Bluetooth, both the first client and the second client enable a Bluetooth function, so as to establish the communication connection by means of Bluetooth pairing, and transfer the transaction amount and the payment request by means of the communication connection.

At S702, a transaction amount is generated, or the transaction amount sent by the second client is received by means of the communication connection.

The transaction amount may refer to the transaction amount that is generated by a first client according to an amount actually to be paid, or may refer to the transaction amount that is received by the first client and generated by a second client. Therefore, before the transaction amount is sent to a first currency management apparatus, the first client also needs to generate the transaction amount or receive, by means of a communication connection between the first client and the second client, the transaction amount sent by the second client.

When the first client directly generates the transaction amount, the first client sends a digital currency exporting request to the first currency management apparatus. The digital currency exporting request indicates the transaction amount, so as to enable the first currency management apparatus to generate the first digital currency corresponding to the transaction amount. Based on this, when the first digital currency corresponding to the transaction amount or a circulation identifier of the first digital currency issued by the first currency management apparatus is received, the first client establishes a communication connection with the second client, and sends a payment request to the second client by means of the communication connection.

When the second client generates the transaction amount, the second client establishes a communication connection with the first client, and sends the transaction amount to the first client by means of the communication connection. When the transaction amount is received by means of the communication connection, the first client sends the digital currency exporting request to the first currency management apparatus corresponding to the first client, so as to enable the first currency management apparatus to generate the first digital currency corresponding to the transaction amount. Based on this, the first client receives the first digital currency corresponding to the transaction amount or the circulation identifier of the first digital currency issued by the first currency management apparatus, and sends, by means of the established communication connection between the first client and the second client, the payment request sent by the second client.

At S703, when the communication connection is disconnected, the communication connection between the first client and the second client is re-established.

It is understandable that, during the process that the first client generates the transaction amount or transmits the transaction amount, there may be a situation that the communication connection between the first client and the second client is disconnected. In addition, when the transaction amount is greater than a threshold amount, and the first client needs to acquire a payment code, there may also be a situation that the communication connection between the first client and the second client is disconnected. Therefore, in order to guarantee normal operation of a payment transaction, before the payment request needs to be sent to the second client by means of the communication connection, and when the communication connection is disconnected, the communication connection between the first client and the second client is re-established. For example, the communication connection is re-established by still using the communication connection, which is initially established, between the first client and the second client, that is, the communication connection is established on the basis of any one of the following: the WLAN, the NFC, and the Bluetooth.

It is to be noted that, during re-establishment of the communication connection, in order to ensure that the established communication connection is still used to transmit information (for example, the payment request, the payment code, etc.) corresponding to the same payment transaction, it may be ensured, on the basis of information such as a transaction identifier, the transaction amount, a time stamp, a transaction counter, a transaction statement, first client information, and second client information, at an application layer or a code layer, that the bottom communication connection re-established for a plurality of times carries the information corresponding to the same payment transaction. In addition, the communication connection may also be maintained by manually inputting, by a user, information, such as a payment message, corresponding to the payment transaction, or the availability of the re-established communication connection is guaranteed. The transaction identifier refers to a serial number or an index number, which is generated randomly and corresponds to a transaction. The time stamp refers to a corresponding time point when the payment transaction occurs. The transaction counter is configured to record the frequency of transactions, such that the communication connection may be re-established according to the frequency corresponding to the transactions that are not completed, so as to continuously complete the transactions that are not completed. The transaction statement refers to detailed information that may distinguish different transactions and is generated according to the time stamp and the transaction information. The first client information or the second client information includes, but is not limited to, information, such as a public key, a user name, and a device identifier, that is mutually transmitted by both parties. For example, during the re-establishment of the communication connection, a communication connection establishment request client may carry the information such as the transaction identifier, the transaction amount, and the time stamp, and send a communication connection establishment request to another client, so as to enable, when the communication connection establishment request is received, another client verify, according to pre-stored information such as the transaction identifier, the transaction amount, and the time stamp, whether the information such as the transaction identifier, the transaction amount, and the time stamp carried by the communication connection establishment request is consistent with the pre-stored information; if so, verification is passed, indicating that the communication connection established by the request and the foregoing communication connection are used for the same payment transaction, so as to re-establish the communication connection between the first client and the second client; and if no, the verification is not passed, such that the communication connection between the first client and the second client is not established.

At S704, the payment request is sent to the second client by means of the communication connection. The payment request indicates the first digital currency corresponding to the transaction amount or the circulation identifier of the first digital currency, so as to enable the second currency management apparatus corresponding to the second client to cash the second digital currency corresponding to the first digital currency to the first currency management apparatus corresponding to the first client.

For example, after receiving the payment request sent by the first client, the second client sends a digital currency cashing request to a second currency management apparatus. The digital currency cashing request indicates the first digital currency or the circulation identifier of the first digital currency. Based on this, the second currency management apparatus sends the first digital currency or the circulation identifier of the first digital currency to the first currency management apparatus, so as to enable the first currency management apparatus to verify the first digital currency or the circulation identifier of the first digital currency, and generate a second digital currency corresponding to the transaction amount or the first digital currency when verification of the first digital currency or the circulation identifier of the first digital currency is passed, such that the digital currency is circulated between the first client and the second client.

In an optional implementation, the method further includes: before the payment request is sent to the second client by means of the communication connection, determining whether the transaction amount is greater than the threshold amount, and when the transaction amount is greater than the threshold amount, acquiring the payment code corresponding to the transaction amount. When the transaction amount is greater than the threshold amount, the payment request further indicates the payment code.

The threshold amount is set according to actual requirements. Therefore, by means of setting the threshold amount, and setting the payment code for the transaction amount greater than the threshold amount, the security of the digital currency during large payment transactions may be guaranteed. It is understandable that, a user corresponding to the first client may preset the threshold amount, and the payment code corresponding to the transaction amount greater than the threshold amount, so as to enable the first currency management apparatus to pre-store the transaction amount and the payment code in a digital currency record corresponding to the first client, such that the payment code is verified during digital currency payment on the basis of the digital currency record corresponding to the first client, so as to guarantee the security of the digital currency. For example, an encryption mode used may be a combination of any one or more of a character string encryption mode (the character string encryption mode of letters, numbers, or a combination of the letters and the numbers), a question-and-answer mode, a voiceprint recognition mode, a facial recognition mode, and an image recognition. Payment codes corresponding to different encryption modes are also different. For example, a key corresponding to the character string encryption mode is a character string completely including the letters (a letter encryption mode), or a character string completely including the number (a number encryption mode), or a character string simultaneously including the letters and the numbers (an encryption mode of combining the letters and the numbers). In addition, the user corresponding to the first client may customize the encryption mode, or the first currency management apparatus may also define the encryption mode according to factors such as easy management or own operations.

For example, after receiving the payment request sent by the first client, the second client sends a digital currency cashing request to a second currency management apparatus. The digital currency cashing request indicates the first digital currency or the circulation identifier of the first digital currency, and the payment code corresponding to the transaction amount. Based on this, the second currency management apparatus sends the first digital currency or the circulation identifier of the first digital currency, and the payment code to the first currency management apparatus, so as to enable the first currency management apparatus to verify the first digital currency or the circulation identifier of the first digital currency, and the payment code, and generate the second digital currency corresponding to the transaction amount or the first digital currency when verification of the first digital currency or the circulation identifier of the first digital currency and the payment code are passed, such that the digital currency is circulated between the first client and the second client.

It is understandable that, after generating the second digital currency, the second currency management apparatus shall update a digital currency record corresponding to the second client, so as to manage the digital currency.

Correspondingly, when the second currency management apparatus has paid the second digital currency, the first currency management apparatus updates a digital currency record corresponding to the first client, so as to realize balance of payments for the total amount of digital currencies during digital currency transaction.

It is worth mentioning that, the currency management apparatuses corresponding to the first client and the second client may be the same or different. In order to monitor a currency circulation between different currency management apparatuses to avoid an illegal transaction between different currency managements, so as to further guarantee the legitimacy and security of the digital currency. When the first currency management apparatus is different from the second currency management apparatus, the second currency management apparatus sends the first digital currency or the circulation identifier of the first digital currency to the first currency management apparatus by means of a third party currency management apparatus that monitors different currency management apparatuses. In addition, after the first currency management apparatus verifies the first digital currency or the circulation identifier of the first digital currency, the first currency management apparatus also sends a corresponding verification result to the second currency management apparatus by means of the third-party currency management apparatus. In addition, when the transaction amount is greater than the threshold amount, the second currency management apparatus also sends the payment code corresponding to the transaction amount to the first currency management apparatus by means of a third-party management apparatus, and receives, by means of the third-party management apparatus, the verification result of the payment code by the first currency management apparatus.

On the basis of the above embodiments, the first digital currency for payments or the identifier of the first digital currency is transferred by means of the communication connection between the first client and the second client, so as to enable the second client to cash the second digital currency corresponding to the first digital currency to the second currency management apparatus corresponding to the second client, such that online payment of the digital currency and circulation between different clients are realized, and the disclosure is convenient and fast. In addition, the security of the digital currency during large payment transactions is guaranteed by setting the payment code when the transaction amount is greater than the threshold amount. In order to avoid the influence of disconnection on the communication connection during acquisition of the payment code, the normal operation of the payment transaction is guaranteed by re-establishing the communication connection corresponding to the payment transaction.

Figure 8:
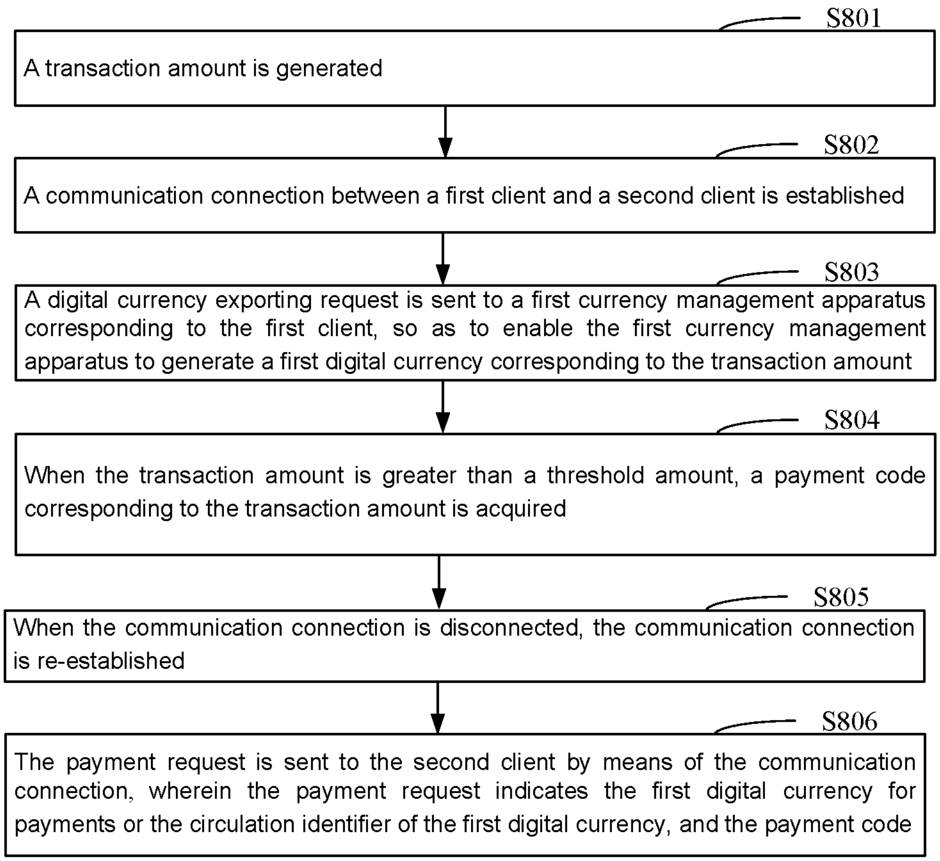
FIG. 8 is a schematic diagram of main processes of another digital currency payment method applied to a first client according to an embodiment of the disclosure.

Referring to FIG. 8, on the basis of the above embodiments, an embodiment of the disclosure provides another digital currency payment method applied to a first client. The method may specifically include the following steps.

At S801, a transaction amount is generated. It is understandable that, the transaction amount may either refer to the transaction amount that is generated by the first client according to an amount actually to be paid, or may refer to the transaction amount that is received by the first client and generated by a second client. In this embodiment, for example, the first client directly generates the transaction amount.

At S802, a communication connection between a first client and a second client is established.

At S803, a digital currency exporting request is sent to a first currency management apparatus corresponding to the first client, so as to enable the first currency management apparatus to generate a first digital currency corresponding to the transaction amount. It is understandable that, after generating the first digital currency, the first currency management apparatus may issue the first digital currency or a circulation identifier of the first digital currency to the first client, so as to enable the first client to send a payment request.

At S804, when the transaction amount is greater than a threshold amount, a payment code corresponding to the transaction amount is acquired. It is understandable that, the transaction amount may be greater than the threshold amount, or may be less than the threshold amount. In this embodiment, for example, the transaction amount is greater than the threshold amount.

At S805, when the communication connection is disconnected, the communication connection is re-established. That is to say, after the communication connection is established initially, and before the payment request is sent, the initially-established communication connection may be disconnected because of a variety of reasons, such as signals and networks, such that in order to guarantee the smooth operation of a payment transaction, the communication connection needs to be re-established. More specifically, when the communication connection is disconnected, the communication connection between the first client and the second client is re-established on the basis of one or more of the following: a transaction identifier, the transaction amount, a time stamp, first client information, and second client information. Therefore, it may be ensured that the re-established communication connection is still used for the same payment transaction.

At S806, the payment request is sent to the second client by means of the communication connection. The payment request indicates the first digital currency for payments or the circulation identifier of the first digital currency, and the payment code.

Figure 9:
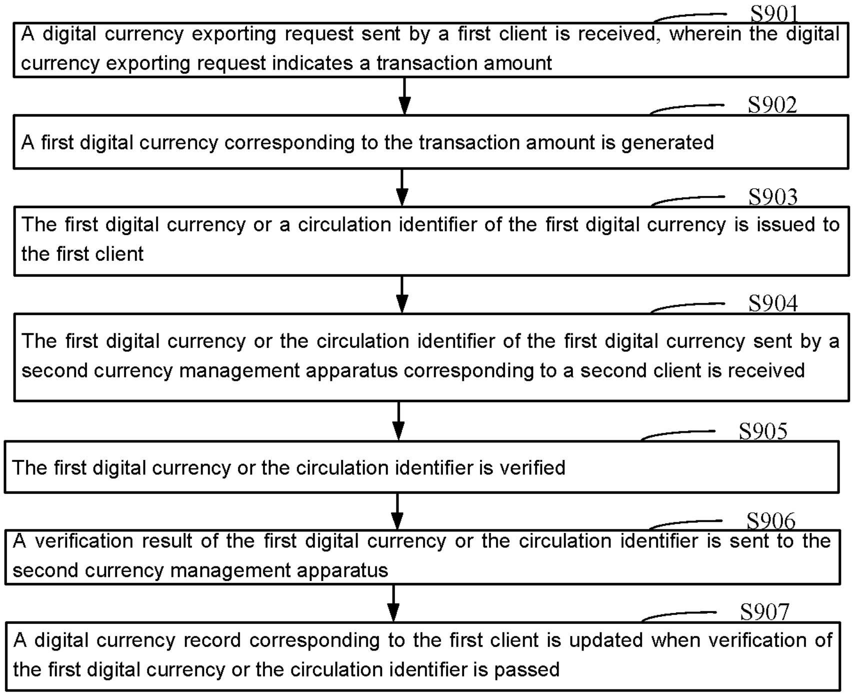
FIG. 9 is a schematic diagram of main processes of a digital currency payment method applied to a first currency management apparatus according to an embodiment of the disclosure.

Referring to FIG. 9, on the basis of the above embodiments, an embodiment of the disclosure provides a digital currency payment method applied to a first currency management apparatus. The method may specifically include the following steps.

At S901, a digital currency exporting request sent by a first client is received. The digital currency exporting request indicates a transaction amount.

At S902, a first digital currency corresponding to the transaction amount is generated.

At S903, the first digital currency or a circulation identifier of the first digital currency is issued to the first client.

At S904, the first digital currency or the circulation identifier of the first digital currency sent by a second currency management apparatus corresponding to a second client is received.

At S905, the first digital currency or the circulation identifier is verified.

After receiving the first digital currency sent by the second currency management apparatus or the circulation identifier, the first currency management apparatus may perform the following verifications on the first digital currency or the circulation identifier according to a digital currency record corresponding to the first client; determining whether the first digital currency or the circulation identifier is the first digital currency that has been recorded or stored, so as to verify the legitimacy of a source of the digital currency; or determining, according to an identifier of the currency management apparatus indicated by the first digital currency, whether the identifier of the currency management apparatus is consistent with the identifier of the first currency management apparatus, and verifying the legitimacy of the source of the digital currency; or performing verification according to the signature of the currency management apparatus included in the first digital currency. For example, the signature of the currency management apparatus is generated by using an asymmetric encryption algorithm, and then the first currency management apparatus may use a private key corresponding to a public key during generation of signature information to decrypt the signature of the currency management apparatus in the first digital currency, so as to verify the reliability of the signature information. Therefore, the legitimacy of the source of the first digital currency may be guaranteed, and the paying security of the digital currency may also be guaranteed.

Further, when the transaction amount is greater than a threshold amount, a payment code, which is sent by the second currency management apparatus corresponding to the second client, corresponding to the transaction amount is also received; and the payment code and a code corresponding to the transaction amount are determined according to the digital currency record corresponding to the first client. When and only when verification of the first digital currency or the circulation identifier and the payment code is passed, the first currency management apparatus updates the digital currency record corresponding to the first client, and the second currency management apparatus generates a second digital currency corresponding to the first digital currency, so as to circulate the digital currency between different clients.

At S906, a verification result of the first digital currency or the circulation identifier is sent to the second currency management apparatus.

At S907, a digital currency record corresponding to the first client is updated when verification of the first digital currency or the circulation identifier is passed.

Figure 10:
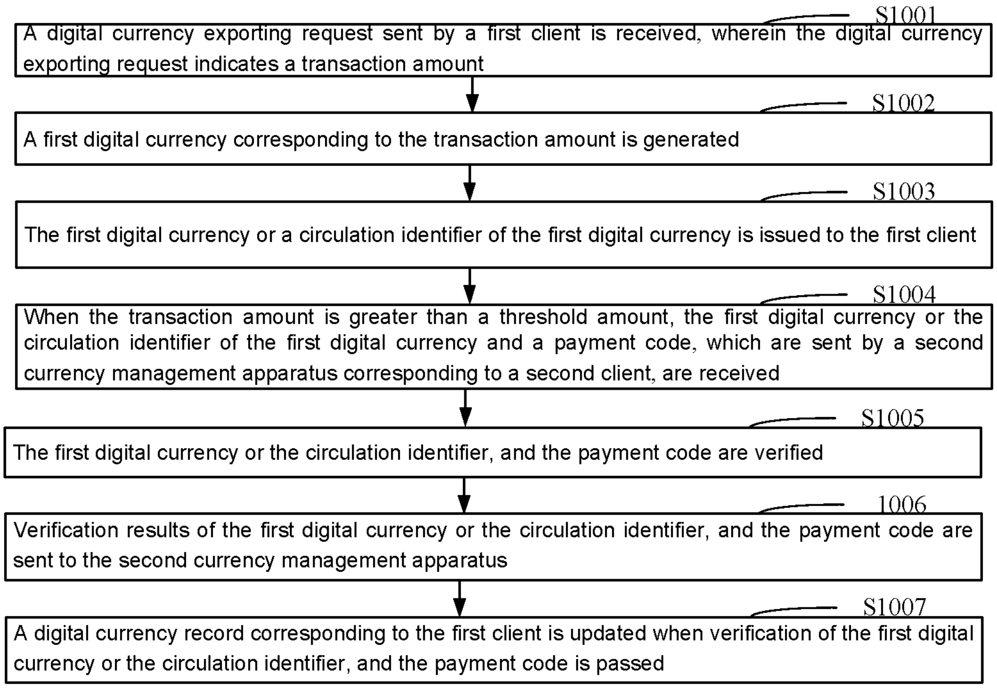
FIG. 10 is a schematic diagram of main processes of another digital currency payment method applied to a first currency management apparatus according to an embodiment of the disclosure.

Referring to FIG. 10, on the basis of the above embodiments, an embodiment of the disclosure provides another digital currency payment method applied to a first currency management apparatus. The method may specifically include the following steps.

At S1001, a digital currency exporting request sent by a first client is received. The digital currency exporting request indicates a transaction amount.

At S1002, a first digital currency corresponding to the transaction amount is generated.

At S1003, the first digital currency or a circulation identifier of the first digital currency is issued to the first client.

At S1004, when the transaction amount is greater than a threshold amount, the first digital currency or the circulation identifier of the first digital currency sent by a second currency management apparatus corresponding to a second client, and a payment code are received.

At S1005, the first digital currency or the circulation identifier, and the payment code are verified.

At S1006, verification results of the first digital currency or the circulation identifier, and the payment code are sent to the second currency management apparatus.

At S1007, a digital currency record corresponding to the first client is updated when verification of the first digital currency or the circulation identifier, and the payment code is passed.

Figure 11:
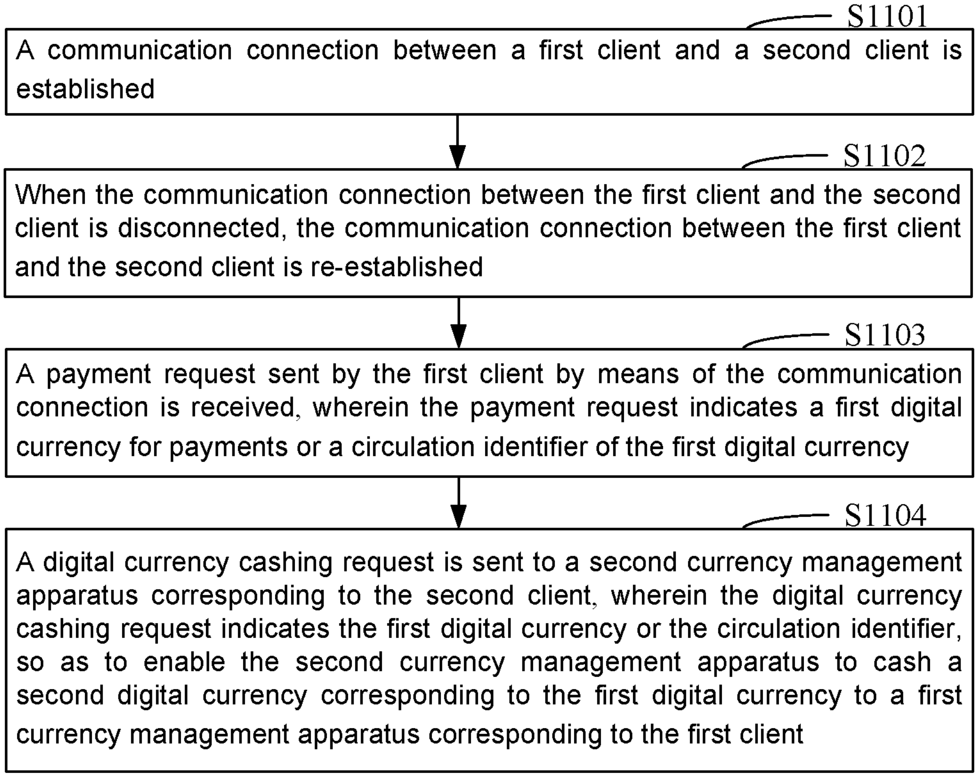
FIG. 11 is a schematic diagram of main processes of a digital currency payment method applied to a second client according to an embodiment of the disclosure.

Referring to FIG. 11, on the basis of the above embodiments, an embodiment of the disclosure provides another digital currency payment method applied to a second client. The method specifically includes the following steps.

At S1101, a communication connection between a first client and a second client is established.

For example, the second client or the first client may establish the communication connection between the first client and the second client on the basis of any one of the following: a WLAN, an NFC, and Bluetooth.

In an optional implementation, the second client may directly generate the transaction amount, and send the transaction amount to the first client by means of the communication connection between the first client and the second client, so as to enable the first client to acquire the payment code corresponding to the transaction amount when the transaction amount is greater than a threshold amount. In addition, the first client may also directly generate the transaction amount.

At S1102, when the communication connection between the first client and the second client is disconnected, the communication connection between the first client and the second client is re-established.

It is understandable that, after the communication connection is established initially, and before the payment request is received, the initially-established communication connection may be disconnected because of a variety of reasons, such as signals and networks, such that in order to guarantee the smooth operation of a payment transaction, the communication connection needs to be re-established. For example, when the communication connection between the first client and the second client is disconnected, the communication connection between the first client and the second client is re-established on the basis of any one of the Bluetooth, the NFC and the WLAN used for initial establishment of the communication connection. For another example, when the communication connection is disconnected, the communication connection between the first client and the second client may be re-established on the basis of one or more of the following: a transaction identifier, the transaction amount, a time stamp, first client information, and second client information. Therefore, it may be ensured that the re-established communication connection is still used for the same payment transaction.

At S1103, a payment request sent by the first client by means of the communication connection is received. The payment request indicates a first digital currency for payments or a circulation identifier of the first digital currency.

At S1104, a digital currency cashing request is sent to a second currency management apparatus corresponding to the second client. The digital currency cashing request indicates the first digital currency or the circulation identifier, so as to enable the second currency management apparatus to cash a second digital currency corresponding to the first digital currency to a first currency management apparatus corresponding to the first client.

In addition, when the transaction amount is greater than a threshold amount, the payment request further indicates a payment code corresponding to the transaction amount; and the digital currency cashing request is sent to the second currency management apparatus corresponding to the second client. The digital currency cashing request further indicates the payment code, so as to enable the first currency management apparatus to verify the payment code, to guarantee the security of a payment transaction of large digital currencies.

Figure 12:
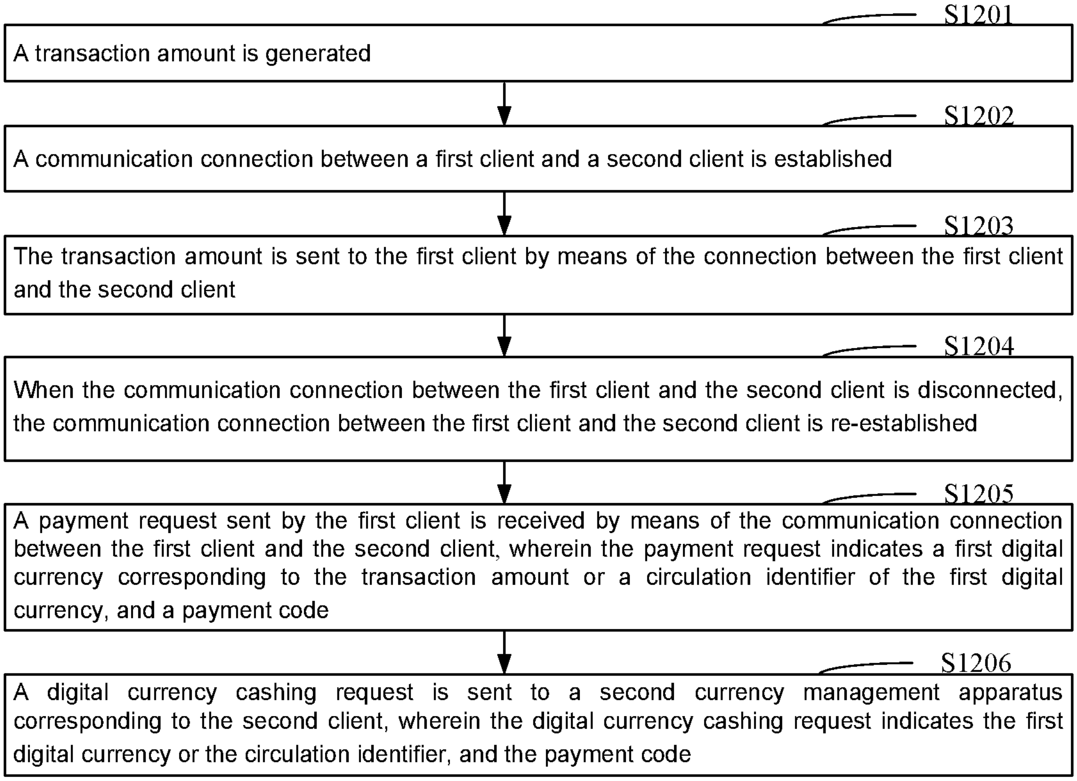
FIG. 12 is a schematic diagram of main processes of another digital currency payment method applied to a second client according to an embodiment of the disclosure.

Referring to FIG. 12, on the basis of the above embodiments, an embodiment of the disclosure provides another digital currency payment method applied to a second client. The method may specifically include the following steps.

At S1201, a transaction amount is generated.

At S1202, a communication connection between a first client and a second client is established.

At S1203, the transaction amount is sent to the first client by means of the connection between the first client and the second client.

At S1204, when the communication connection between the first client and the second client is disconnected, the communication connection between the first client and the second client is re-established. For example, when the communication connection between the first client and the second client is disconnected, the communication connection between the first client and the second client is re-established on the basis of any one of the Bluetooth, the NFC and the WLAN used for initial establishment of the communication connection. For another example, when the communication connection is disconnected, the communication connection between the first client and the second client may be re-established on the basis of one or more of the following: a transaction identifier, the transaction amount, a time stamp, first client information, and second client information. Therefore, it may be ensured that the re-established communication connection is still used for the same payment transaction.

At S1205, a payment request sent by the first client is received by means of the communication connection between the first client and the second client. The payment request indicates a first digital currency corresponding to the transaction amount or a circulation identifier of the first digital currency, and a payment code.

At S1206, a digital currency cashing request is sent to a second currency management apparatus corresponding to the second client, and the digital currency cashing request indicates the first digital currency or the circulation identifier, and the payment code.

Figure 13:
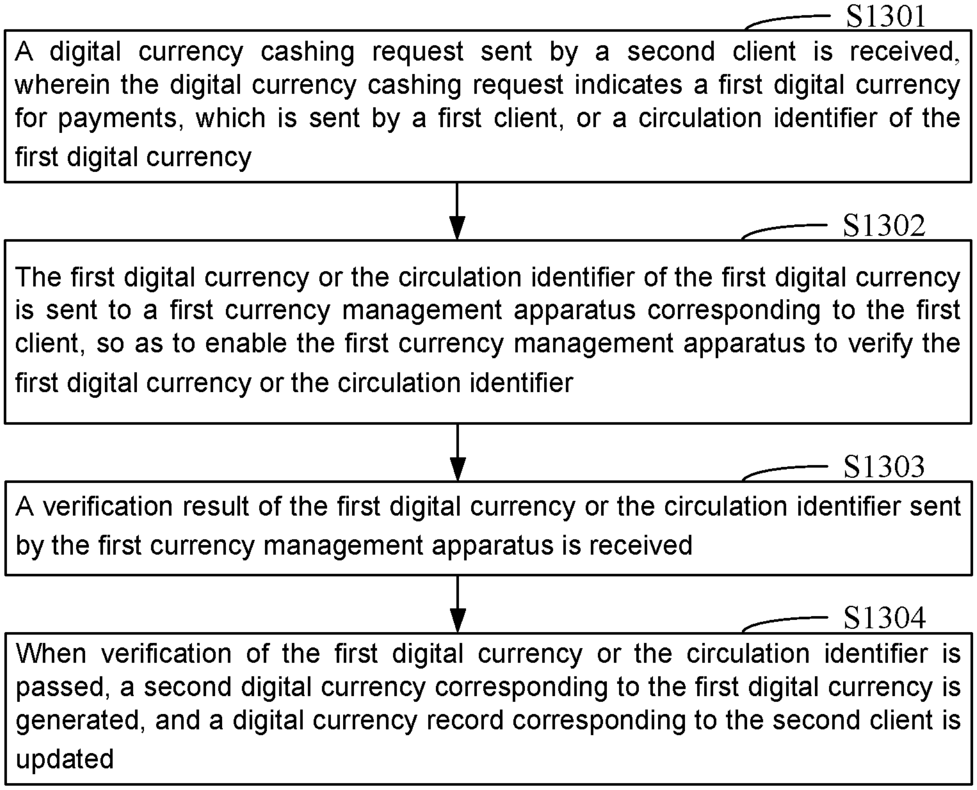
FIG. 13 is a schematic diagram of main processes of a digital currency payment method applied to a second currency management apparatus according to an embodiment of the disclosure.

Referring to FIG. 13, on the basis of the above embodiments, an embodiment of the disclosure provides a digital currency payment method applied to a second currency management apparatus. The method may specifically include the following steps.

At S1301, a digital currency cashing request sent by a second client is received. The digital currency cashing request indicates a first digital currency for payments or a circulation identifier of the first digital currency, which is sent by a first client. When the transaction amount is greater than a threshold amount, the digital currency cashing request further indicates a payment code corresponding to the transaction amount.

At S1302, the first digital currency or the circulation identifier of the first digital currency is sent to a first currency management apparatus corresponding to the first client, so as to enable the first currency management apparatus to verify the first digital currency or the circulation identifier.

At S1303, a verification result of the first digital currency or the circulation identifier by the first currency management apparatus is received.

At S1304, when verification of the first digital currency or the circulation identifier is passed, a second digital currency corresponding to the first digital currency is generated, and a digital currency record corresponding to the second client is updated.

In addition, when the transaction amount is greater than the threshold amount, and in order to guarantee the security of a large transaction amount, the digital currency cashing request further indicates the payment code corresponding to the transaction amount. When receiving the payment code, the second currency management apparatus sends the payment code to the first currency management apparatus, so as to enable the first currency management apparatus to verify the payment code. When and only when verification of the first digital currency or the circulation identifier and the payment code is passed, the first currency management apparatus updates the digital currency record corresponding to the first client, and the second currency management apparatus generates a second digital currency corresponding to the first digital currency, so as to circulate the digital currency between different clients.

Figure 14:
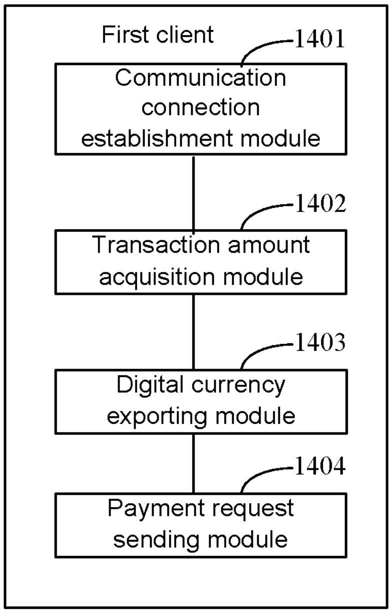
FIG. 14 is a schematic diagram of main modules of a first client for digital currency payment according to an embodiment of the disclosure.

Referring to FIG. 14, on the basis of any one of the above embodiments related to FIG. 1 or FIG. 2, an embodiment of the disclosure provides a first client for digital currency payment. The first client includes: a transaction amount acquisition module 1402 and a payment request sending module 1404.

The transaction amount acquisition module 1402 is configured to generate a transaction amount, or acquire, by means of a communication connection between a first client and a second client, the transaction amount sent by the second client.

The payment request sending module 1404 is configured to send a payment request to the second client by means of the communication connection. The payment request indicates a first digital currency corresponding to the transaction amount or a circulation identifier of the first digital currency, so as to enable a second currency management apparatus corresponding to the second client to cash a second digital currency corresponding to the transaction amount to a first currency management apparatus corresponding to the first client.

In an optional implementation, the first client further includes a communication connection establishment module 1401.

The communication connection establishment module is configured to establish the communication connection between the first client and the second client on the basis of any one of the following: a WLAN, an NFC, and Bluetooth.

In an optional implementation, the first client further includes a digital currency exporting module 1403.

The digital currency exporting module is configured to send a digital currency exporting request to the first currency management apparatus. The digital currency exporting request indicates the transaction amount, so as to enable the first currency management apparatus to generate the first digital currency corresponding to the transaction amount.

Figure 15:
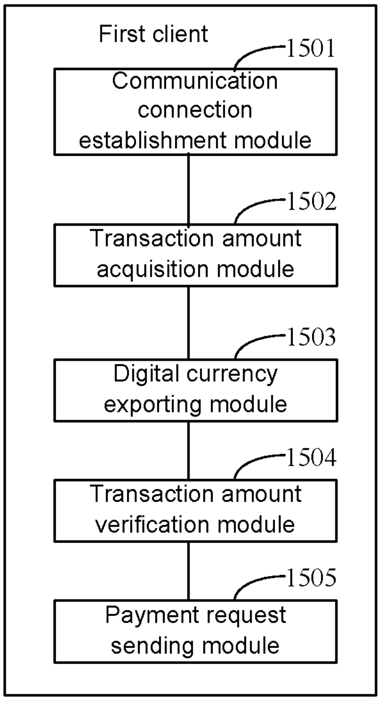
FIG. 15 is a schematic diagram of main modules of another first client for digital currency payment according to an embodiment of the disclosure.

Referring to FIG. 15, on the basis of any one of the above embodiments related to FIG. 7 or FIG. 8, an embodiment of the disclosure provides a first client for digital currency payment. The first client includes: a communication connection establishment module 1501, a transaction amount acquisition module 1502, and a payment request sending module 1505.

The communication connection establishment module 1501 is configured to establish a communication connection between a first client and the second client.

The transaction amount acquisition module 1502 is configured to generate a transaction amount, or receive, by means of the communication connection, the transaction amount sent by the second client.

The communication connection establishment module 1501 is further configured to re-establish the communication connection between the first client and the second client when the communication connection between the first client and the second client is disconnected.

The payment request sending module 1505 is configured to send a payment request to the second client by means of the communication connection. The payment request indicates a first digital currency corresponding to the transaction amount or a circulation identifier of the first digital currency, so as to enable a second currency management apparatus corresponding to the second client to cash a second digital currency corresponding to the first digital currency to a first currency management apparatus corresponding to the first client.

In an optional implementation, the first client further includes a transaction amount verification module 1504.

The transaction amount verification module 1504 is configured to determine whether the transaction amount is greater than a threshold amount, and when the transaction amount is greater than the threshold amount, acquire a payment code corresponding to the transaction amount.

When the transaction amount is greater than the threshold amount, the payment request further indicates the payment code.

In an optional implementation, the communication connection establishment module 1501 is configured to establish the communication connection between the first client and the second client on the basis of any one of the following: a WLAN, an NFC, and Bluetooth.

In an optional implementation, the communication connection establishment module 1501 is configured to, when the communication connection is disconnected, re-establish the communication connection between the first client and the second client on the basis of one or more of the following: a transaction identifier, the transaction amount, a time stamp, a transaction counter, a transaction statement, first client information, and second client information. Therefore, it may be ensured that the re-established communication connection is still used for the same payment transaction.

In an optional implementation, the first client further includes a digital currency exporting module 1503.

The digital currency exporting module 1503 is configured to send a digital currency exporting request to the first currency management apparatus. The digital currency exporting request indicates the transaction amount, so as to enable the first currency management apparatus to generate the first digital currency corresponding to the transaction amount.

Figure 16:
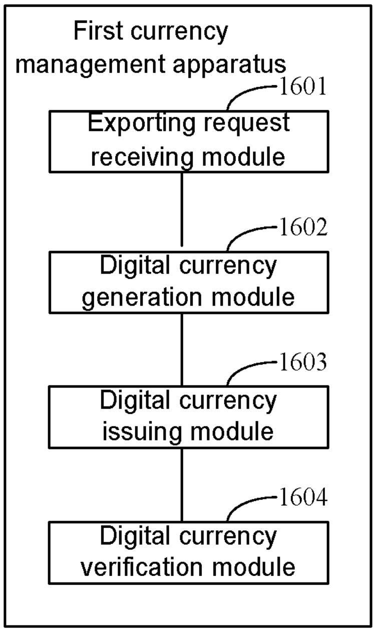
FIG. 16 is a schematic diagram of main modules of a first currency management apparatus for digital currency payment according to an embodiment of the disclosure.

Referring to FIG. 16, on the basis of the embodiment related to FIG. 3, an embodiment of the disclosure provides a first currency management apparatus for digital currency payment. The first currency management apparatus includes: an exporting request receiving module 1601, a digital currency generation module 1602, and a digital currency issuing module 1603.

The exporting request receiving module 1601 is configured to receive a digital currency exporting request sent by a first client. The digital currency exporting request indicates a transaction amount.

The digital currency generation module 1602 is configured to generate a first digital currency corresponding to the transaction amount.

The digital currency issuing module 1603 is configured to issue the first digital currency or a circulation identifier of the first digital currency to the first client.

In an optional implementation, the first client further includes a digital currency verification module 1604.

The digital currency verification module 1604 is configured to verify the first digital currency or the circulation identifier when the first digital currency or the circulation identifier sent by a second currency management apparatus corresponding to a second client is received.

A verification result of the first digital currency or the circulation identifier is sent to the second currency management apparatus.

A digital currency record corresponding to the first client is updated when verification of the first digital currency or the circulation identifier is passed.

Referring to FIG. 16, on the basis of the embodiment related to FIG. 9 or FIG. 10, an embodiment of the disclosure provides a first currency management apparatus for digital currency payment. The first currency management apparatus includes: an exporting request receiving module 1601, a digital currency generation module 1602, and a digital currency issuing module 1603.

The exporting request receiving module 1601 is configured to receive a digital currency exporting request sent by a first client. The digital currency exporting request indicates a transaction amount.

The digital currency generation module 1602 is configured to generate a first digital currency corresponding to the transaction amount.

The digital currency issuing module 1603 is configured to issue the first digital currency or a circulation identifier of the first digital currency to the first client.

In an optional implementation, the first currency management apparatus further includes a digital currency verification module 1604.

The digital currency verification module 1604 is configured to: receive the first digital currency or the circulation identifier of the first digital currency sent by a second currency management apparatus corresponding to a second client or the circulation identifier;

verify the first digital currency or the circulation identifier according to the digital currency record corresponding to the first client;

send a verification result of the first digital currency or the circulation identifier to the second currency management apparatus;

Update a digital currency record corresponding to the first client when verification of the first digital currency or the circulation identifier is passed.

In an optional implementation, the digital currency verification module 904 is further configured to perform the following operations.

When the transaction amount is greater than a threshold amount, a payment code, which is sent by the second currency management apparatus corresponding to the second client, corresponding to the transaction amount is received.

The payment code is verified according to the digital currency record corresponding to the first client.

Figure 17:
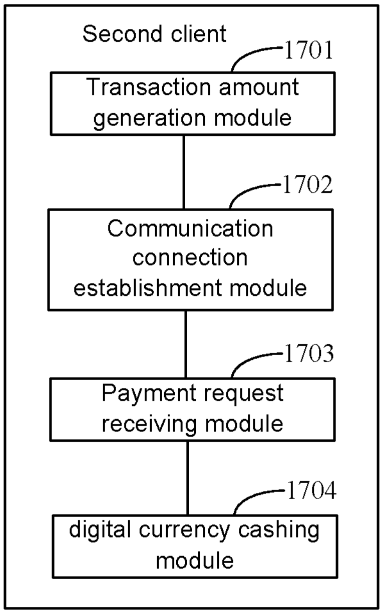
FIG. 17 is a schematic diagram of main modules of a second client for digital currency payment according to an embodiment of the disclosure.

Referring to FIG. 17, on the basis of any one of the above embodiments related to FIG. 4 or FIG. 5, an embodiment of the disclosure provides a second client for digital currency payment. The second client includes: a payment request receiving module 1703 and a digital currency cashing module 1704.

The payment request receiving module 1703 is configured to receive, by means of a communication connection between a first client and a second client, a payment request sent by the first client. The payment request indicates a first digital currency corresponding to a transaction amount or a circulation identifier of the first digital currency.

The digital currency cashing module 1704 is configured to send a digital currency cashing request to a second currency management apparatus corresponding to the second client. The digital currency cashing request indicates the first digital currency or the circulation identifier, so as to enable the second currency management apparatus to cash a second digital currency corresponding to the transaction amount to a first currency management apparatus corresponding to the first client.

In an optional implementation, the second client further includes a transaction amount generation module 1701.

The transaction amount generation module is configured to generate the transaction amount, and send, by means of the communication connection between the first client and the second client, the transaction amount to the first client.

In an optional implementation, the second client further includes a communication connection establishment module 1702.

The communication connection establishment module 1702 is configured to establish the communication connection between the first client and the second client on the basis of any one of the following: a WLAN, an NFC, and Bluetooth.

Figure 18:
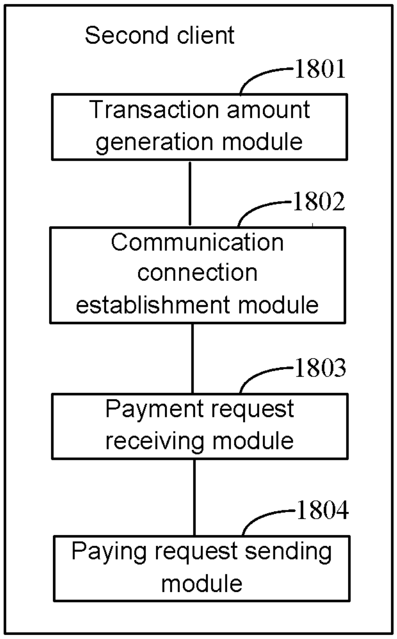
FIG. 18 is a schematic diagram of main modules of another second client for digital currency payment according to an embodiment of the disclosure.

Referring to FIG. 18, on the basis of any one of the above embodiments related to FIG. 11 or FIG. 12, an embodiment of the disclosure provides a second client for digital currency payment. The second client includes: a communication connection establishment module 1802, a payment request receiving module 1803, and a paying request sending module 1804.

The communication connection establishment module 1802 is configured to establish a communication connection between a first client and the second client.

The communication connection establishment module 1802 is further configured to re-establish the communication connection between the first client and the second client when the communication connection between the first client and the second client is disconnected.

The payment request receiving module 1803 is configured to receive a payment request, which is sent by the first client by means of the communication connection. The payment request indicates a first digital currency for payments or a circulation identifier of the first digital currency.

The paying request sending module 1804 is configured to send a digital currency cashing request to a second currency management apparatus corresponding to the second client. The digital currency cashing request indicates the first digital currency or the circulation identifier, so as to enable the second currency management apparatus to cash a second digital currency corresponding to the first digital currency to a first currency management apparatus corresponding to the first client.

In an optional implementation, the second client further includes a transaction amount generation module 1801.

The transaction amount generation module is configured to generate a transaction amount, and send the transaction amount to the first client by means of the communication connection between the first client and the second client, so as to enable the first client to acquire the payment code corresponding to the transaction amount when the transaction amount is greater than a threshold amount.

In an optional implementation, when the transaction amount is greater than the threshold amount, the payment request further indicates the payment code corresponding to the transaction amount.

The paying request sending module 1804 is configured to send a digital currency cashing request to the second currency management apparatus corresponding to the second client. The digital currency cashing request further indicates the payment code.

In an optional implementation, the communication connection establishment module 1802 is configured to establish the communication connection between the first client and the second client on the basis of any one of the following: a WLAN, an NFC, and Bluetooth.

In an optional implementation, the communication connection establishment module 1802 is configured to, when the communication connection is disconnected, re-establish the communication connection between the first client and the second client on the basis of one or more of the following: a transaction identifier, the transaction amount, a time stamp, a transaction counter, a transaction statement, first client information, and second client information. Therefore, it may be ensured that the re-established communication connection is still used for the same payment transaction.

Figure 19:
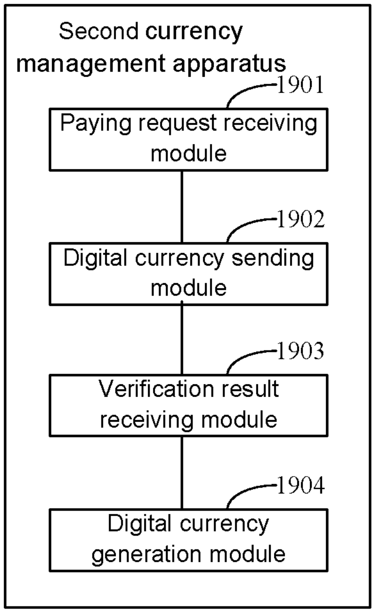
FIG. 19 is a schematic diagram of main modules of a second currency management apparatus for digital currency payment according to an embodiment of the disclosure.

Referring to FIG. 19, on the basis of any one of the above embodiments related to FIG. 6, an embodiment of the disclosure provides a second currency management apparatus for digital currency payment. The second currency management apparatus includes: a paying request receiving module 1901, a digital currency sending module 1902, a verification result receiving module 1903, and a digital currency generation module 1904.

The paying request receiving module 1901 is configured to receive a digital currency cashing request sent by a second client. The digital currency cashing request indicates a first digital currency, which is sent by a first client, corresponding to a transaction amount or a circulation identifier of the first digital currency.

The digital currency sending module 1902 is configured to send the first digital currency or the circulation identifier to a first currency management apparatus corresponding to the first client, so as to enable the first currency management apparatus to verify the first digital currency or the circulation identifier.

The verification result receiving module 1903 is configured to receive a verification result of the first digital currency or the circulation identifier sent by the first currency management apparatus.

The digital currency generation module 1904 is configured to, when verification of the first digital currency or the circulation identifier is passed, generate a second digital currency corresponding to the transaction amount, and update a digital currency record corresponding to the second client.

Referring to FIG. 19, on the basis of any one of the above embodiments related to FIG. 13, an embodiment of the disclosure provides a second currency management apparatus for digital currency payment. The second currency management apparatus includes: a paying request receiving module 1901, a digital currency sending module 1902, a verification result receiving module 1903, and a digital currency generation module 1904.

The paying request receiving module 1901 is configured to receive a digital currency cashing request sent by a second client. The digital currency cashing request indicates a first digital currency for payments or a circulation identifier of the first digital currency, which is sent by a first client.

The digital currency sending module 1902 is configured to send the first digital currency or the circulation identifier of the first digital currency to a first currency management apparatus corresponding to the first client, so as to enable the first currency management apparatus to verify the first digital currency or the circulation identifier.

The verification result receiving module 1903 is configured to receive a verification result of the first digital currency or the circulation identifier by the first currency management apparatus.

The digital currency generation module 1904 is configured to, when verification of the first digital currency or the circulation identifier is passed, generate a second digital currency corresponding to the first digital currency, and update a digital currency record corresponding to the second client.

In an optional implementation, when the transaction amount is greater than a threshold amount, the digital currency cashing request further indicates a payment code corresponding to the transaction amount. The digital currency sending module 1902 is further configured to send the payment cod to the first currency management apparatus, so as to receive a verification result of the payment code.

Figure 20:
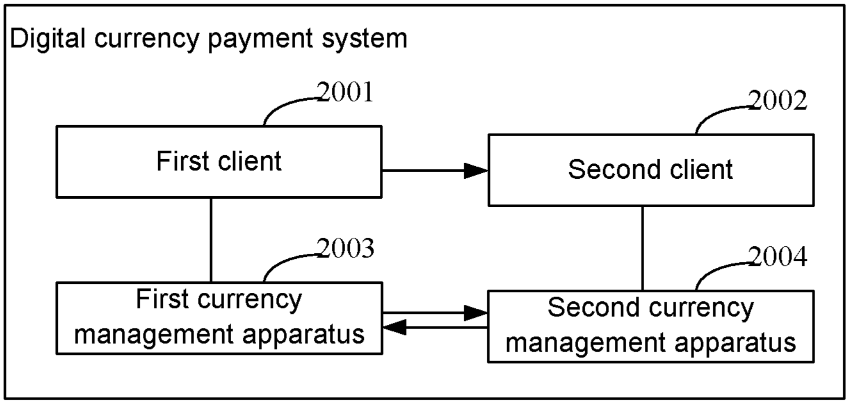
FIG. 20 is a schematic diagram of a main structure of a digital currency payment system according to an embodiment of the disclosure.

Referring to FIG. 20, on the basis of the above embodiments, an embodiment of the disclosure provides a digital currency payment system, which includes: a first client 2001, a second client 2002, a first currency management apparatus 2003 corresponding to the first client, and a second currency management apparatus 2004 corresponding to the second client.

On the basis of any one of the above embodiments related to FIG. 1 to FIG. 6, the first client 2001 is configured to generate a transaction amount or acquire, by means of a communication connection between the first client and the second client, the transaction amount sent by the second client, and send a payment request to the second client by means of the communication connection. The payment request indicates a first digital currency corresponding to a transaction amount or a circulation identifier of the first digital currency.

The second client 2002 is configured to receive, by means of the communication connection between the first client and the second client, the payment request sent by the first client, and send a digital currency cashing request to the second currency management apparatus corresponding to the second client. The digital currency cashing request indicates the first digital currency or the circulation identifier.

The first currency management apparatus 2003 is configured to: receive a digital currency exporting request sent by the first client, where the digital currency exporting request indicates the transaction amount; generate the first digital currency corresponding to the transaction amount; and issue the first digital currency or the circulation identifier of the first digital currency to the first client.

The second currency management apparatus 2004 is configured to receive the digital currency cashing request sent by the second client, and cash a second digital currency corresponding to the transaction amount to the first currency management apparatus corresponding to the first client.

On the basis of any one of the above embodiments related to FIG. 7 to FIG. 13, the first client 2001 is configured to: establish the communication connection between the first client and the second client; generate the transaction amount or acquire, by means of the communication connection, the transaction amount sent by the second client; when the communication connection is disconnected, re-establish the communication connection between the first client and the second client; and send a payment request to the second client by means of the communication connection. The payment request indicates the first digital currency corresponding to the transaction amount or the circulation identifier of the first digital currency.

The second client 2002 is configured to: establish the communication connection between the first client and the second client; when the communication connection is disconnected, re-establish the communication connection between the first client and the second client; receive the payment request sent by the first client by means of the communication connection; and send a digital currency cashing request to the second currency management apparatus corresponding to the second client. The digital currency cashing request indicates the first digital currency or the circulation identifier.

The first currency management apparatus 2003 is configured to: receive a digital currency exporting request sent by the first client, where the digital currency exporting request indicates the transaction amount; generate the first digital currency corresponding to the transaction amount; and issue the first digital currency or the circulation identifier of the first digital currency to the first client.

The second currency management apparatus 2004 is configured to receive the digital currency cashing request sent by the second client, and cash the second digital currency corresponding to the first digital currency to the first currency management apparatus corresponding to the first client.

Figure 21:
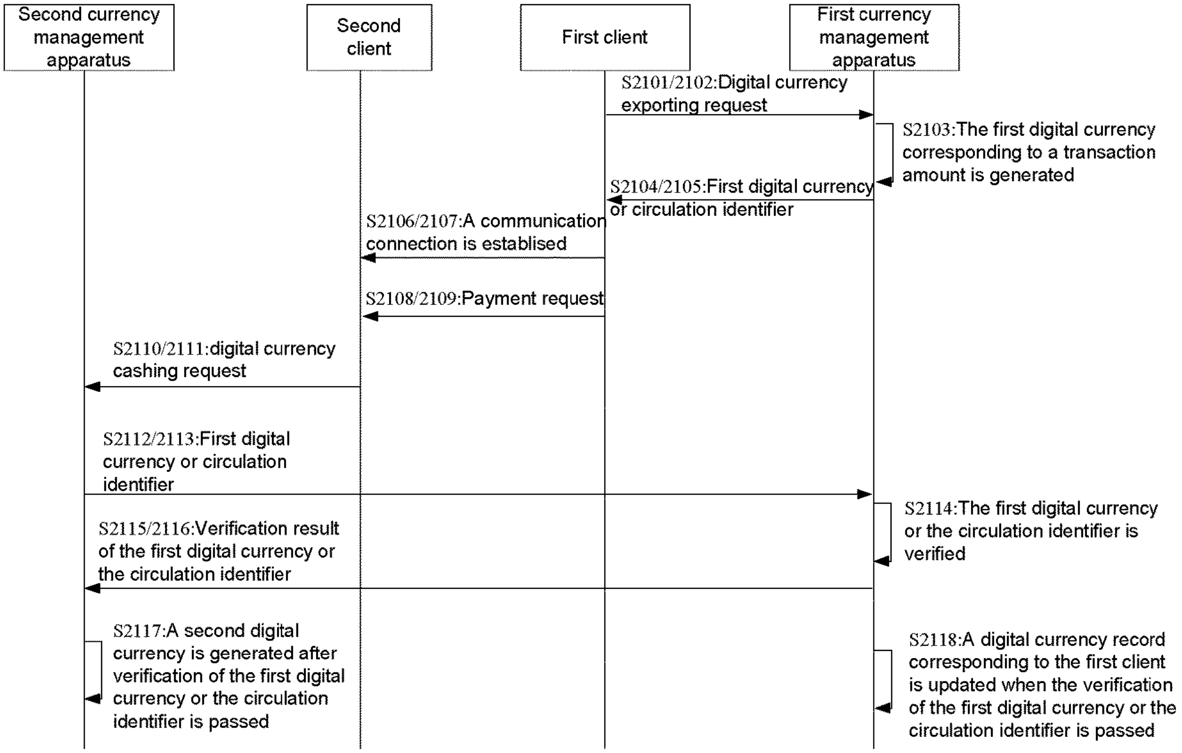
FIG. 21 is a schematic diagram of main processes of a digital currency payment method applied to a digital currency payment system according to an embodiment of the disclosure.

Referring to FIG. 21, on the basis of the above embodiments related to FIG. 1 to FIG. 6, an embodiment of the disclosure provides a digital currency payment method applied to a digital currency payment system. The method may specifically include the following steps.

At S2101, a first client sends a digital currency exporting request to a first currency management apparatus. The digital currency exporting request indicates a transaction amount.

It is understandable that, the transaction amount may refer to the transaction amount that is generated by a first client according to an amount actually to be paid, or may refer to the transaction amount that is received by the first client and generated by a second client. Therefore, before the transaction amount is sent to a first currency management apparatus, the first client also needs to generate the transaction amount or receive, by means of a communication connection between the first client and the second client, the transaction amount sent by the second client. In this embodiment, for example, the first client directly generates the transaction amount.

At S2102, the first currency management apparatus receives the digital currency exporting request sent by the first client.

At S2103, the first currency management apparatus generates a first digital currency corresponding to the transaction amount. After generating the first digital currency, the first currency management apparatus updates a digital currency record corresponding to the first client, so as to manage the circulation of digital currencies.

At S2104, the first currency management apparatus issues the first digital currency or a circulation identifier of the first digital currency to the first client.

At S2105, the first client receives the first digital currency or the circulation identifier of the first digital currency issued by the first currency management apparatus.

At S2106, the first client establishes the communication connection with the second client. Specifically, the communication connection between the first client and the second client is established on the basis of any one of the following: a WLAN, an NFC, and Bluetooth.

At S2107, the second client establishes the communication connection with the first client.

At S2108, the first client sends a payment request to the second client by means of the communication connection. The payment request indicates a first digital currency for payments or a circulation identifier of the first digital currency.

At S2109, the second client receives, by means of the communication connection, the payment request sent by the first client.

At S2110, the second client sends a digital currency cashing request to a second currency management apparatus. The digital currency cashing request indicates the first digital currency or the circulation identifier of the first digital currency.

At S2111, the second currency management apparatus receives the digital currency cashing request sent by the second client.

At S2112, the second currency management apparatus sends the first digital currency or the circulation identifier of the first digital currency to the first currency management apparatus.

At S2113, the first currency management apparatus receives the first digital currency or the circulation identifier of the first digital currency, which is sent by the second currency management apparatus.

At S2114, the first currency management apparatus verifies the first digital currency or the circulation identifier of the first digital currency.

At S2115, the first currency management apparatus sends a verification result of the first digital currency or the circulation identifier of the first digital currency to the second currency management apparatus.

At S2116, the second currency management apparatus receives the verification result, which is sent by the first currency management apparatus, of the first digital currency or the circulation identifier of the first digital currency.

At S2117, the second currency management apparatus generates a second digital currency when verification of the first digital currency or the circulation identifier of the first digital currency is passed. In addition, the second currency management apparatus shall update a digital currency record corresponding to the second client.

At S2118, the first currency management apparatus updates a digital currency record corresponding to the first client when the verification of the first digital currency or the circulation identifier of the first digital currency is passed.

Figure 22:
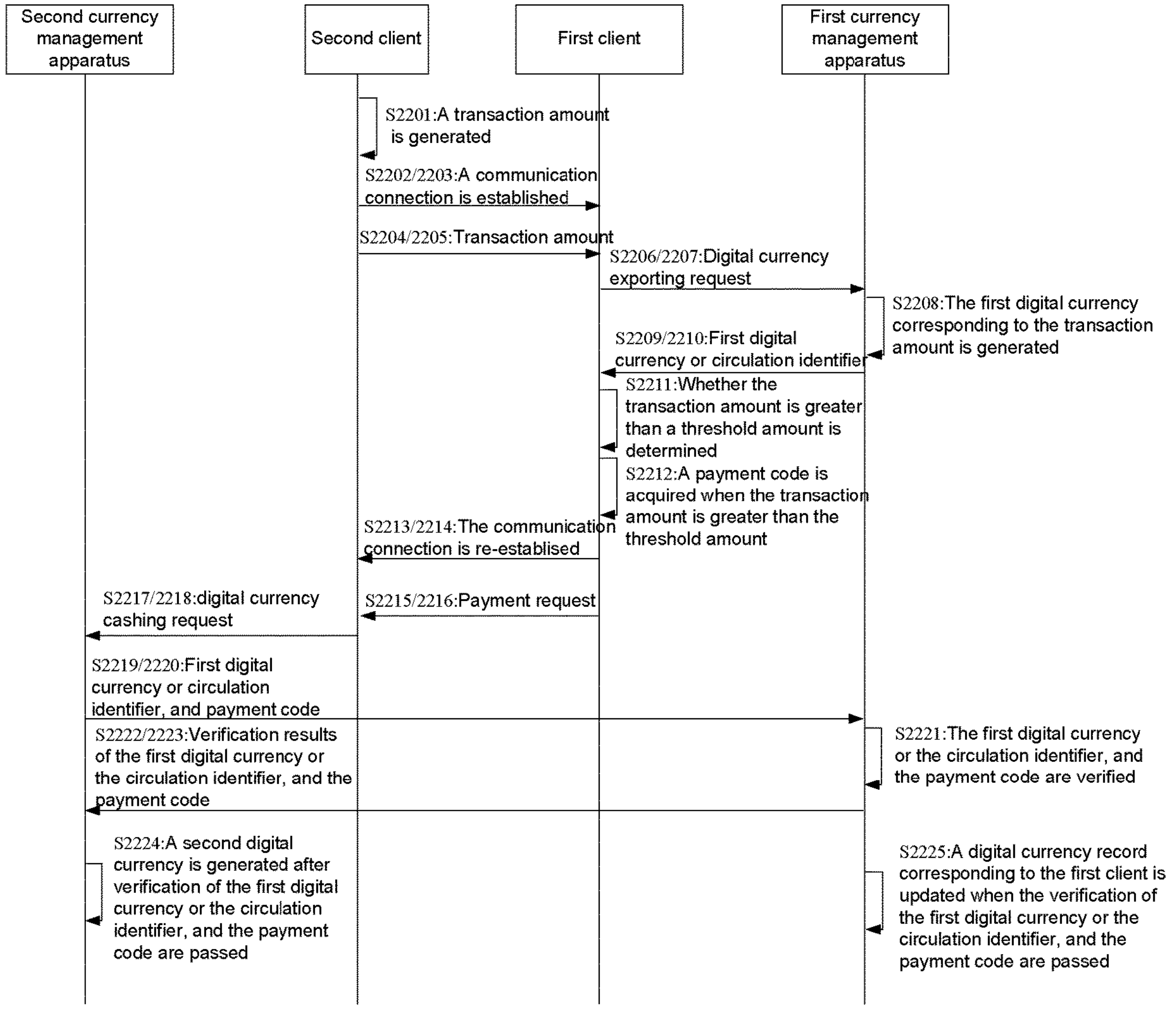
FIG. 22 is a schematic diagram of main processes of another digital currency payment method applied to a digital currency payment system according to an embodiment of the disclosure.

Referring to FIG. 22, on the basis of the above embodiments related to FIG. 7 to FIG. 13, an embodiment of the disclosure provides a digital currency payment method applied to a digital currency payment system. The method may specifically include the following steps.

At S2201, a second client generates a transaction amount. It is understandable that, the transaction amount may be generated by the second client, or may be generated by a first client. In this embodiment, for example, the second client generates the transaction amount.

At S2202, the second client establishes a communication connection with the first client. For example, the communication connection may be established by means of any one of a WLAN, an NFC, and Bluetooth.

At S2203, the first client establishes the communication connection with the second client. For example, the communication connection is established by means of any one of a WLAN, an NFC, and Bluetooth.

At S2204, the second client sends the transaction amount to the first client by means of the communication connection.

At S2205, the first client receives, by means of the communication connection, the transaction amount sent by the second client.

At S2206, the first client sends a digital currency exporting request to a first currency management apparatus. The digital currency exporting request indicates the transaction amount.

At S2207, the first currency management apparatus receives the digital currency exporting request sent by the first client.

At S2208, the first currency management apparatus generates a first digital currency corresponding to the transaction amount.

At S2209, the first currency management apparatus issues the first digital currency or a circulation identifier of the first digital currency to the first client.

At S2210, the first client receives the first digital currency or the circulation identifier of the first digital currency issued by the first currency management apparatus.

At S2211, the first client determines whether the transaction amount is greater than a threshold amount.

At S2212, the first client acquires a payment code corresponding to the transaction amount when the transaction amount is greater than the threshold amount.

At S2213, when the communication connection is disconnected, the first client re-establishes the communication connection between the first client and the second client. For example, when the communication connection is disconnected, the communication connection between the first client and the second client is re-established on the basis of one or more of the following: a transaction identifier, the transaction amount, a time stamp, a transaction counter, a transaction statement, first client information, and second client information. Therefore, it may be ensured that the re-established communication connection is still used for the same payment transaction.

At S2214, when the communication connection is disconnected, the second client re-establishes the communication connection with the first client. For example, when the communication connection is disconnected, the communication connection between the first client and the second client is re-established on the basis of one or more of the following: a transaction identifier, the transaction amount, a time stamp, first client information, and second client information. Therefore, it may be ensured that the re-established communication connection is still used for the same payment transaction.

At S2215, the first client sends a payment request to the second client by means of the re-established communication connection. The payment request indicates the first digital currency or the circulation identifier of the first digital currency, and the payment code.

At S2216, the second client receives, by means of the re-established communication connection, the payment request sent by the first client.

At S2217, the second client sends a digital currency cashing request to a second currency management apparatus. The digital currency cashing request indicates the first digital currency or the circulation identifier of the first digital currency, and the payment code.

At S2218, the second currency management apparatus receives the digital currency cashing request sent by the second client.

At S2219, the second currency management apparatus sends the first digital currency or the circulation identifier of the first digital currency, and the payment code to the first currency management apparatus.

At S2220, the first currency management apparatus receives the first digital currency or the circulation identifier of the first digital currency, and the payment code, which are sent by the second currency management apparatus.

At S2221, the first currency management apparatus verifies the first digital currency or the circulation identifier of the first digital currency, and the payment code.

At S2222, the first currency management apparatus sends verification results of the first digital currency or the circulation identifier of the first digital currency, and the payment code to the second currency management apparatus.

At S2223, the second currency management apparatus receives the verification results of the first digital currency or the circulation identifier of the first digital currency, and the payment code, which are sent by the first currency management apparatus.

At S2224, the second currency management apparatus generates a second digital currency corresponding to the first digital currency when verification of the first digital currency or the circulation identifier of the first digital currency, and the payment code are passed. In addition, the second currency management apparatus further updates a digital currency record corresponding to the second client.

At S2225, the first currency management apparatus updates a digital currency record corresponding to the first client when the verification of the first digital currency or the circulation identifier of the first digital currency, and the payment code are passed.

Figure 23:
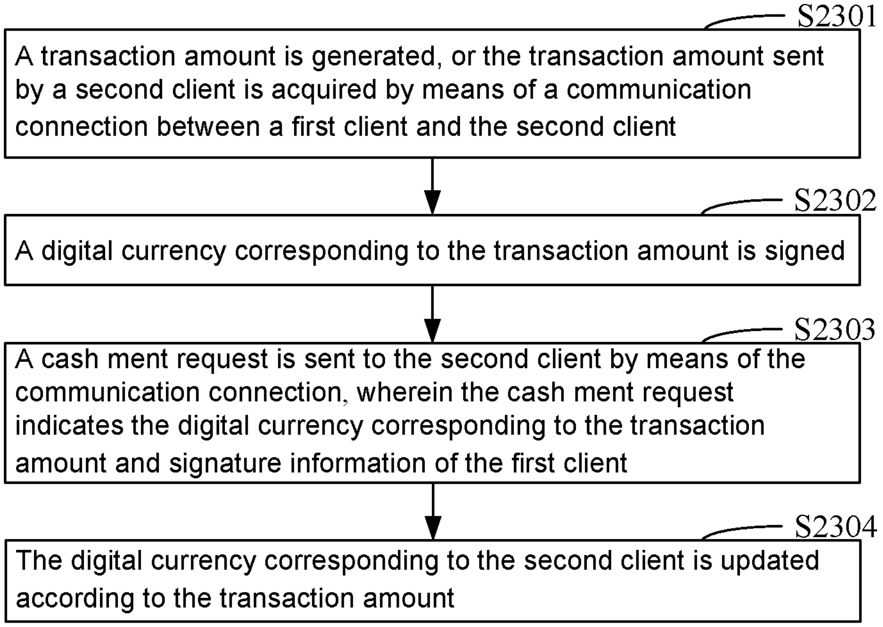
FIG. 23 is a schematic diagram of main processes of still another digital currency payment method applied to a first client according to an embodiment of the disclosure.

Referring to FIG. 23, an embodiment of the disclosure provides still another digital currency payment method applied to a first client. The method specifically includes the following steps.

At S2301, a transaction amount is generated, or the transaction amount sent by a second client is acquired by means of a communication connection between a first client and the second client.

At S2302, a digital currency corresponding to the transaction amount is signed. For example, the first client may sign the digital currency corresponding to the transaction amount by using a private key of the first client, such that the second client may verify signature information by using a public key corresponding to the first client, so as to guarantee the security and legitimacy of the source of the digital currencies. In addition, the first client may further encrypt the digital currencies according to actual situations by means of other signature modes agreed with the second client. For example, the digital currencies are encrypted by using a public key of the second client, so as to enable the second client to decrypt the digital currencies by using a private key.

Further, in addition to signing the digital currencies corresponding to the transaction amount, the first client may also sign transaction information such as the transaction identifier, the transaction amount, and the time stamp, so as to further improve the security of transactions.

It is to be noted that, in this embodiment, the digital currencies that may be directly used for the transactions and acquired by means of transaction and charging have already been in the first client, such that the digital currencies do not need to be exported, and the digital currencies are paid more conveniently and universally.

At S2303, a payment request is sent to the second client by means of the communication connection. The payment request indicates the digital currency corresponding to the transaction amount and signature information of the first client.

At S2304, the digital currency corresponding to the first client is updated according to the transaction amount. Specifically, for example, the denomination of the digital currency corresponding to the first client or the available balance of the digital currency is 80. If the transaction amount is 30, the updated denomination of the digital currency corresponding to the first client or the available balance of the digital currency is 50.

Figure 24:
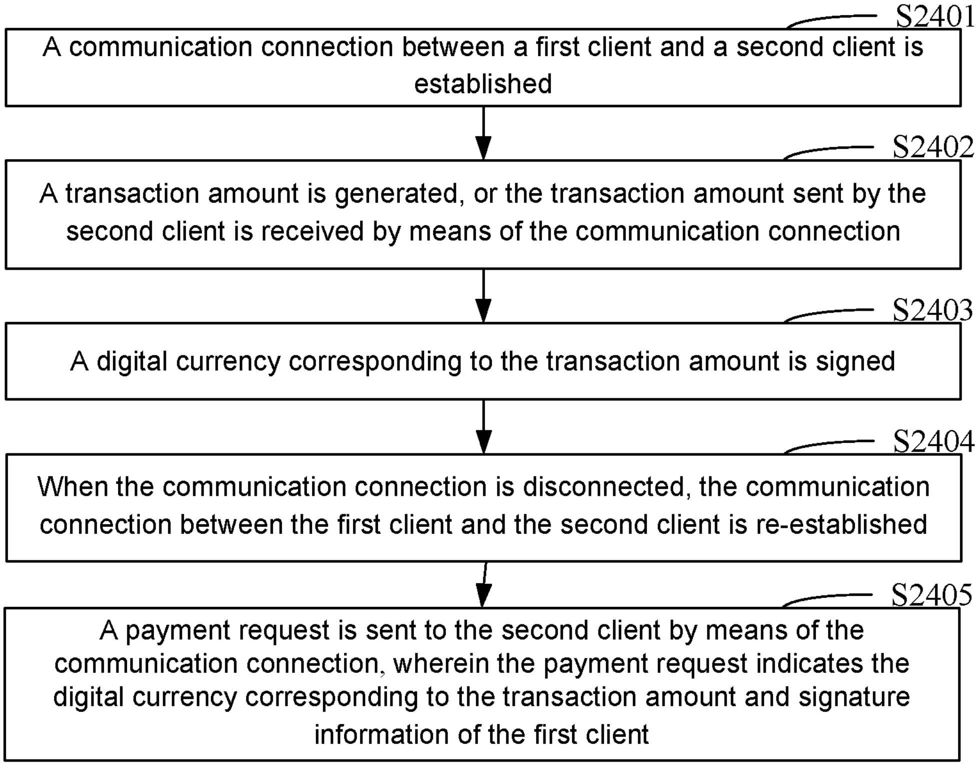
FIG. 24 is a schematic diagram of main processes of another digital currency payment method applied to a first client according to an embodiment of the disclosure.

Referring to FIG. 24, on the basis of the above embodiments, an embodiment of the disclosure provides still another digital currency payment method applied to a first client. The method may specifically include the following steps.

At S2401, a communication connection between a first client and a second client is established.

At S2402, a transaction amount is generated, or the transaction amount sent by the second client is received by means of the communication connection.

In an optional implementation, whether the transaction amount is greater than a threshold amount is determined, and when the transaction amount is greater than the threshold amount, a payment code corresponding to the transaction amount is acquired.

At S2403, a digital currency corresponding to the transaction amount is signed.

For example, the first client may sign the digital currency corresponding to the transaction amount by using a private key of the first client, such that the second client may verify signature information by using a public key corresponding to the first client, so as to guarantee the security and legitimacy of the source of the digital currencies. In addition, the first client may further encrypt the digital currencies according to actual situations by means of other signature modes agreed with the second client. For example, the digital currencies are encrypted by using a public key of the second client, so as to enable the second client to decrypt the digital currencies by using a private key.

It is to be noted that, in this embodiment, the digital currencies that may be directly used for the transactions and acquired by means of transaction and charging have already been in the first client, such that the digital currencies do not need to be exported, and the digital currencies are paid more conveniently and universally.

At S2403, when the communication connection is disconnected, the communication connection between the first client and the second client is re-established.

At S2405, a payment request is sent to the second client by means of the communication connection. The payment request indicates the digital currency corresponding to the transaction amount and signature information of the first client.

In an optional implementation, when the transaction amount is greater than the threshold amount, the payment request further indicates the payment code.

In an implementation, the method further includes the following operation.

A digital currency corresponding to the first client is updated according to the transaction amount.

In an optional implementation, the communication connection between the first client and the second client is established on the basis of any one of the following: a WLAN, an NFC, and Bluetooth.

In an optional implementation, when the communication connection is disconnected, the communication connection between the first client and the second client is re-established on the basis of one or more of the following: a transaction identifier, the transaction amount, a time stamp, a transaction counter, a transaction statement, first client information, and second client information.

Figure 25:
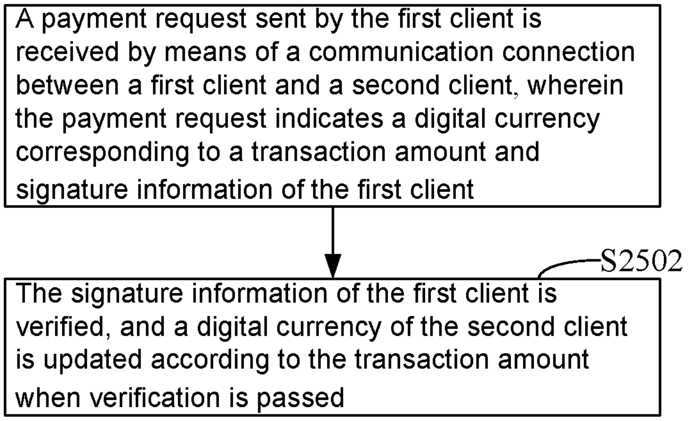
FIG. 25 is a schematic diagram of main processes of still another digital currency payment method applied to a second client according to an embodiment of the disclosure.

Referring to FIG. 25, an embodiment of the disclosure provides still another digital currency payment method applied to a second client. The method specifically includes the following steps.

At S2501, a payment request sent by the first client is received by means of a communication connection between a first client and a second client. The payment request indicates a digital currency corresponding to a transaction amount and signature information of the first client.

At S2502, the signature information of the first client is verified, and a digital currency of the second client is updated according to the transaction amount when verification is passed. For example, the second client uses a private key of the first client to decrypt the signature information for verification. It is understandable that, when the first client performs encryption in other manners of using a public key of the second client, the second client performs decryption in a corresponding manner of using a private key of the second client.

Figure 26:
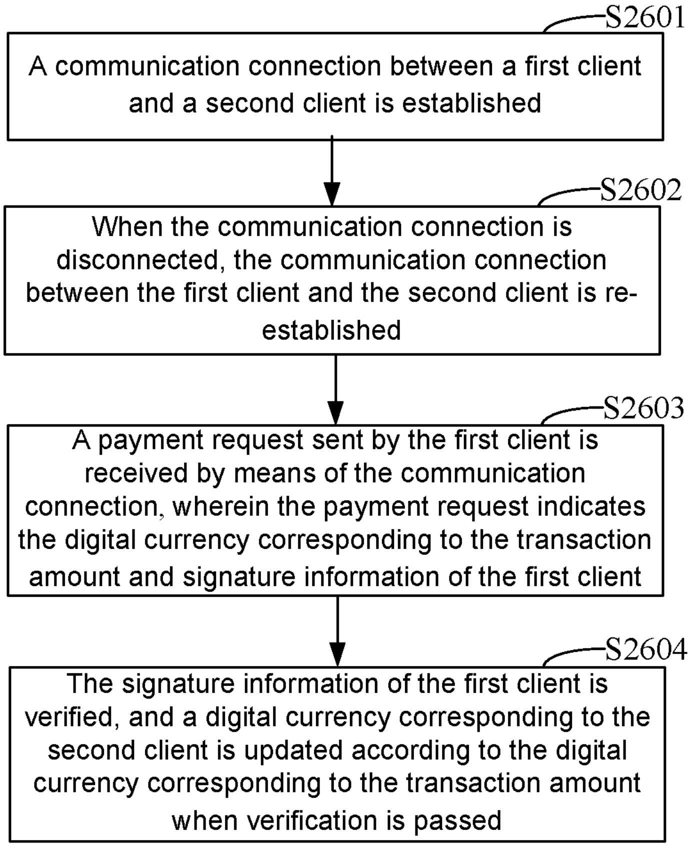
FIG. 26 is a schematic diagram of main processes of another digital currency payment method applied to a second client according to an embodiment of the disclosure.

Referring to FIG. 26, on the basis of the above embodiments, an embodiment of the disclosure provides still another digital currency payment method applied to a second client. The method may specifically include the following steps.

At S2601, a communication connection between a first client and a second client is established.

At S2602, when the communication connection is disconnected, the communication connection between the first client and the second client is re-established.

At S2603, a payment request sent by the first client is received by means of the communication connection. The payment request indicates the digital currency corresponding to the transaction amount and signature information of the first client.

In an optional implementation, when the transaction amount is greater than a threshold amount, the payment request further indicates a payment code corresponding to the transaction amount.

At S2604, the signature information of the first client is verified, and a digital currency corresponding to the second client is updated according to the digital currency corresponding to the transaction amount when verification is passed.

For example, the second client uses a private key of the first client to decrypt the signature information for verification. It is understandable that, when the first client performs encryption in other manners of using a public key of the second client, the second client performs decryption in a corresponding manner of using a private key of the second client.

It is understandable that, when the transaction amount is greater than the threshold amount, the payment code that is indicated by the payment request and corresponds to the transaction amount also needs to be verified. When and only when the payment code and verification information of the first client are verified, the digital currency, which may be directly used for transaction, corresponding to the second client is updated according to the digital currency corresponding to the transaction amount.

In an implementation, the method further includes the following operation.

Before the payment request sent by the first client is received by means of the communication connection, the transaction amount is generated, and the transaction amount is sent to the first client by means of the communication connection, so as to enable the first client to acquire the payment code corresponding to the transaction amount when the transaction amount is greater than the threshold amount.

In an optional implementation, the communication connection between the first client and the second client is established on the basis of any one of the following: a WLAN, an NFC, and Bluetooth.

In an optional implementation, when the communication connection is disconnected, the communication connection between the first client and the second client is re-established on the basis of one or more of the following: a transaction identifier, the transaction amount, a time stamp, a transaction counter, a transaction statement, first client information, and second client information.

Figure 27:
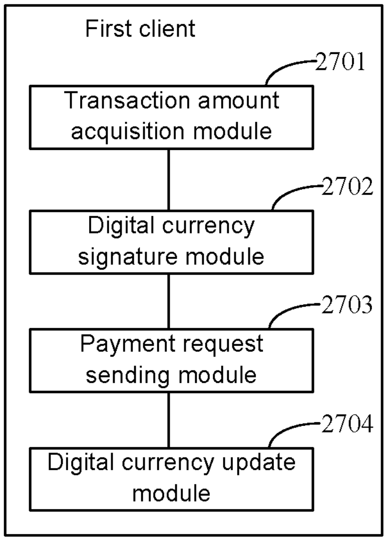
FIG. 27 is a schematic diagram of main modules of another first client for digital currency payment according to an embodiment of the disclosure.

Referring to FIG. 27, an embodiment of the disclosure provides another first client for digital currency payment. The first client includes: a transaction amount acquisition module 2701, a digital currency signature module 2702, a payment request sending module 2703, and a digital currency update module 2704.

The transaction amount acquisition module 2701 is configured to generate a transaction amount, or acquire, by means of a communication connection between a first client and a second client, the transaction amount sent by the second client.

The digital currency signature module 2702 is configured to sign a digital currency corresponding to the transaction amount.

The payment request sending module 2703 is configured to send a payment request to the second client by means of the communication connection. The payment request indicates the digital currency corresponding to the transaction amount and signature information of the first client.

The digital currency update module 2704 is configured to update, according to the transaction amount, a digital currency corresponding to the first client.

Figure 28:
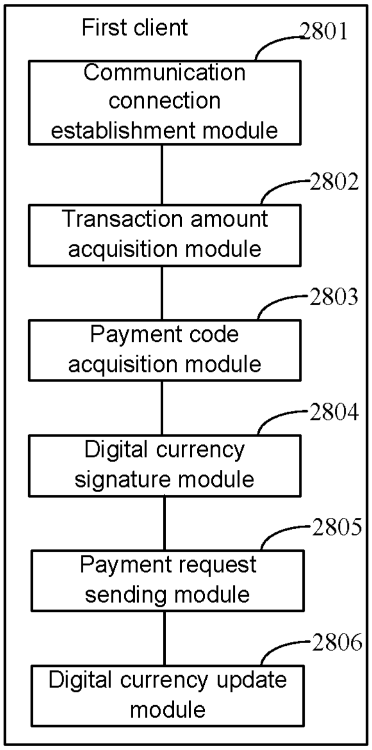
FIG. 28 is a schematic diagram of main modules of still another first client for digital currency payment according to an embodiment of the disclosure.

Referring to FIG. 28, on the basis of the above embodiments, an embodiment of the disclosure provides another first client for digital currency payment. The first client includes: a communication connection establishment module 2801, a transaction amount acquisition module 2802, a digital currency signature module 2804, and a payment request sending module 2805.

The communication connection establishment module 2801 is configured to establish a communication connection between a first client and the second client.

The transaction amount acquisition module 2802 is configured to generate a transaction amount, or receive, by means of the communication connection, the transaction amount sent by the second client.

The digital currency signature module 2804 is configured to sign a digital currency corresponding to the transaction amount.

The communication connection establishment module is further configured to re-establish the communication connection between the first client and the second client when the communication connection is disconnected.

The payment request sending module 2805 is configured to send a payment request to the second client by means of the communication connection. The payment request indicates the digital currency corresponding to the transaction amount and signature information of the first client.

In an optional implementation, the first client further includes a digital currency update module 2806.

The digital currency update module 2806 is configured to update, according to the transaction amount, the digital currency corresponding to the first client.

In an optional implementation, the first client further includes a payment code acquisition module 2803.

The payment code acquisition module 2803 is configured to determine whether the transaction amount is greater than a threshold amount, and when the transaction amount is greater than the threshold amount, acquire a payment code corresponding to the transaction amount.

When the transaction amount is greater than the threshold amount, the payment request further indicates the payment code.

In an optional implementation, the communication connection establishment module 2801 is configured to establish the communication connection between the first client and the second client on the basis of any one of the following: a WLAN, an NFC, and Bluetooth.

In an optional implementation, the communication connection establishment module 2801 is configured to, when the communication connection is disconnected, re-establish the communication connection between the first client and the second client on the basis of one or more of the following: a transaction identifier, the transaction amount, a time stamp, a transaction counter, a transaction statement, first client information, and second client information.

Figure 29:
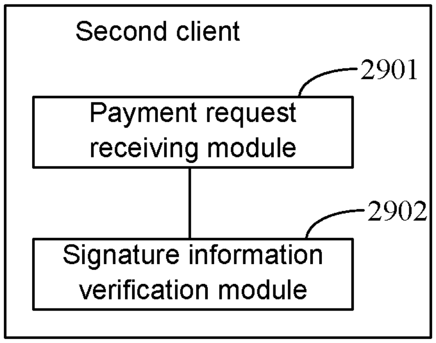
FIG. 29 is a schematic diagram of main modules of another second client for digital currency payment according to an embodiment of the disclosure.

Referring to FIG. 29, an embodiment of the disclosure provides another second client for digital currency payment. The second client includes: a payment request receiving module 2901 and a signature information verification module 2902.

The payment request receiving module 2901 is configured to receive, by means of a communication connection between a first client and a second client, a payment request sent by the first client. The payment request indicates a digital currency corresponding to a transaction amount and signature information of the first client.

The signature information verification module 2902 is configured to verify the signature information of the first client, and update a digital currency of the second client according to the transaction amount when verification is passed.

Figure 30:
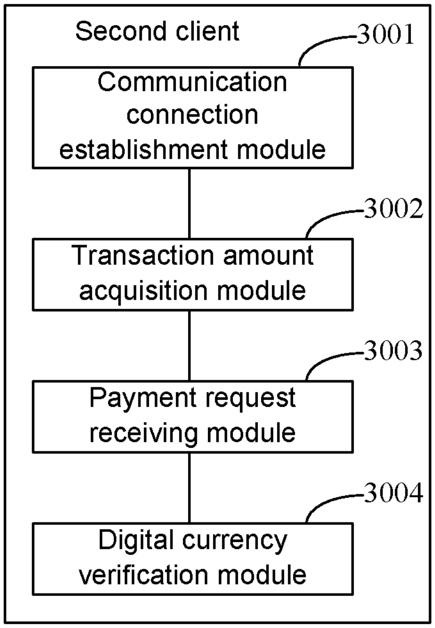
FIG. 30 is a schematic diagram of main modules of still another second client for digital currency payment according to an embodiment of the disclosure.

Referring to FIG. 30, on the basis of the above embodiments, an embodiment of the disclosure provides another second client for digital currency payment. The second client includes: a communication connection establishment module 3001, a payment request receiving module 3003, and a digital currency verification module 3004.

The communication connection establishment module 3001 is configured to establish a communication connection between a first client and the second client.

The communication connection establishment module 3001 is further configured to re-establish the communication connection between the first client and the second client when the communication connection is disconnected.

The payment request receiving module 3003 is configured to receive, by means of the communication connection, a payment request sent by the first client. The payment request indicates a digital currency corresponding to the transaction amount and signature information of the first client.

The digital currency verification module 3004 is configured to verify the signature information of the first client, and update the digital currency corresponding to the second client according to the digital currency corresponding to the transaction amount when verification is passed.

In an optional implementation, the second client further includes a transaction amount acquisition module 3002.

The transaction amount acquisition module 3002 is configured to, before the payment request sent by the first client is received by means of the communication connection, generate the transaction amount, and send the transaction amount to the first client by means of the communication connection.

For example, the first client determines whether the transaction amount is greater than a threshold amount, so as to acquire, when the transaction amount is greater than the threshold amount, the payment code corresponding to the transaction amount.

In an optional implementation, when the transaction amount is greater than the threshold amount, the payment request further indicates the payment code corresponding to the transaction amount; and the payment code is verified, so as to update the digital currency corresponding to the second client according to the digital currency corresponding to the transaction amount when verification is passed.

In an optional implementation, the communication connection establishment module 3001 is configured to establish the communication connection between the first client and the second client on the basis of any one of the following: a WLAN, an NFC, and Bluetooth.

In an optional implementation, the communication connection establishment module 3001 is configured to, when the communication connection is disconnected, re-establish the communication connection between the first client and the second client on the basis of one or more of the following: a transaction identifier, the transaction amount, a time stamp, a transaction counter, a transaction statement, first client information, and second client information.

Figure 31:
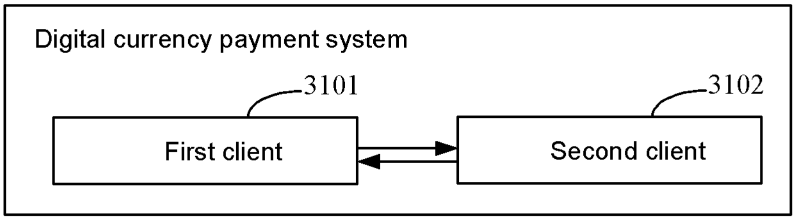
FIG. 31 is a schematic diagram of a main structure of another digital currency payment system according to an embodiment of the disclosure.

Referring to FIG. 31, an embodiment of the disclosure provides another digital currency payment system, which includes: a first client 3101 and a second client 3102.

In this embodiment of the disclosure, the first client 3101 is configured to: generate a transaction amount or acquire, by means of a communication connection between the first client and the second client, the transaction amount sent by the second client; sign a digital currency corresponding to the transaction amount; send a payment request to the second client by means of the communication connection, wherein the payment request indicates the digital currency corresponding to the transaction amount and signature information of the first client; and update, according to the transaction amount, a digital currency corresponding to the first client.

The second client 3102 is configured to: receive, by means of the communication connection between the first client and the second client, the payment request sent by the first client, wherein the payment request indicates the digital currency corresponding to the transaction amount and the signature information of the first client; and verify the signature information of the first client, and update a digital currency of the second client according to the transaction amount when verification is passed.

In another embodiment of the disclosure, the first client 3101 is configured to: establish the communication connection between the first client and the second client; generate the transaction amount or receive, by means of the communication connection, the transaction amount sent by the second client; sign the digital currency corresponding to the transaction amount; when the communication connection is disconnected, re-establish the communication connection between the first client and the second client; and send the payment request to the second client by means of the communication connection. The payment request indicates the digital currency corresponding to the transaction amount and the signature information of the first client.

The second client 3102 is configured to: establish the communication connection between the first client and the second client; when the communication connection is disconnected, re-establish the communication connection between the first client and the second client; receive, by means of the communication connection, the payment request sent by the first client, wherein the payment request indicates the digital currency corresponding to the transaction amount and the signature information of the first client; and verify the signature information of the first client, and update the digital currency corresponding to the second client according to the digital currency corresponding to the transaction amount.

Figure 32:
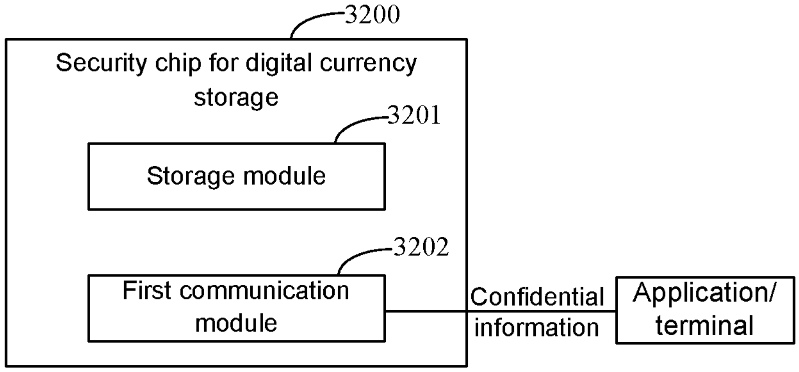
FIG. 32 is a schematic diagram of main modules of a security chip for digital currency storage according to an embodiment of the disclosure.

FIG. 32 is a schematic diagram of main modules of a security chip for digital currency storage according to an embodiment of the disclosure.

As shown in FIG. 32, an embodiment of the disclosure provides a security chip 3200 for digital currency storage. The security chip includes a storage module 3201 and a first communication module 3202.

The storage module 3201 is configured to store confidential information related to a digital currency.

The first communication module 3202 is configured to, when an information request sent by an application or a terminal is received, send the confidential information to the application or the terminal according to the information request. The application or the terminal is an application or a terminal that uses the digital currency for transaction.

The confidential information related to the digital currency may be any one or more of the following: a private key and a public key of a first user corresponding to the terminal, a public key of a second user specified by the first user, a public key of a currency management apparatus, a digital currency, identifier information of the digital currency, a transaction frequency threshold of the digital currency, an offline duration threshold of the digital currency, a payment key of the first user, a payment limit of the first user, state information of the application, identifier information of the application, and identifier information of the terminal.

The second user specified by the first user may be the second user transacting with the first user or a fixed contact specified by the first user. Generally, the fixed contact is also a user who has transacted with the first user or is about to transact with the first user. That is to say, the public key of the second user may be used for a transaction between the first user and the second user by using the digital currency. The currency management apparatus corresponds to an operating agency (for example, a bank) of the digital currency, and a public key of the currency management apparatus is a public key of the operating agency of the corresponding digital currency.

The identifier information of the digital currency may be the circulation identifier of the digital currency, and the circulation identifier may be in the form of a character string or a two-dimensional code. The transaction frequency threshold of the digital currency is configured to verify a transaction frequency of the digital currency; when the digital currency is traded each time, the transaction frequency is increased by one; and only when the transaction frequency of the digital currency is less than the transaction frequency threshold, the transaction is allowed to be continued with the digital currency. The offline duration threshold of the digital currency is configured to verify an offline duration of the digital currency; and only when the offline duration of the digital currency is less than the offline duration threshold, the digital currency is allowed to be continuously traded.

The payment key of the user may be a key for the digital currency that is defined by the user, and may be in various forms of character strings, voiceprints or facial features. When a payment transaction is performed by using the digital currency, the user needs to input a corresponding payment key; and when the payment key inputted by the user is the same as a payment key stored in the security chip, the payment transaction is allowed to be performed. The payment limit of the user may be the maximum amount of the digital currency that the user may spend for a single transaction, or may be a total amount of the digital currency available to the user over a certain period of time.

In addition, the application may be a wallet for managing the digital currency in the terminal, and the state information of the application is the state of the wallet for managing the digital currency, for example, a login-in state or a non-logged-in state. Only when the state is the login-in state, the application can acquire the confidential information from the security chip. Correspondingly, the identifier information of the application may be identifier information of an ID of the wallet for managing the digital currency. The identifier information of the terminal may be an identification code of the terminal. When the digital currency is used for transactions, information of the corresponding digital currency may be acquired by reading the identification code of the terminal, so as to perform the transaction of the digital currency according to the identification code of the terminal.

In order to conveniently manage the confidential information related to the digital currency, in an embodiment of the disclosure, the storage module 3201 is configured to determine a storage state of the confidential information according to a confidentiality level of the confidential information, and store the confidential information according to the storage state, wherein the storage state indicates whether the confidential information is visible to a user.

The confidentiality level of the confidential information may be determined by the currency management apparatus corresponding to the security chip. After determining the confidentiality level of the information related to the digital currency, the currency management apparatus sends the information related to the digital currency and the confidentiality level to the terminal where the security chip is located, so as to enable the terminal to determine, according to the confidentiality level to the information, the confidential information that is storable in the security chip, and then stores the confidential information into the security chip according to storage states corresponding to different confidentiality levels.

For example, the information related to the digital currency is classified into three confidentiality levels; and a first level is the highest level of confidentiality. The corresponding confidential information is stored in the security chip in the storage state that is invisible to the user. For example, the private key and the public key of the first user, and the public key of the second user specified by the first user all belong to the first level. A second level is lower in confidentiality level compared with the first level. The corresponding confidential information is stored in the security chip in the storage state that is visible to the user. For example, the digital currency, the identifier information of the digital currency, the transaction frequency threshold of the digital currency, and the offline duration threshold of the digital currency all belong to the second level. A third level is the lowest level of confidentiality. The corresponding information may not be stored in the security chip, for example, the identifier information of the user (a login name of the user), the available balance of the digital currency, etc.

In addition, when an available storage space of the security chip is less than a preset threshold, the first communication module is configured to send prompt information about updating the digital currency online and/or limiting a transaction frequency to the application or the terminal.

The preset threshold may be determined according to a total storage space of the security chip. For example, the preset threshold is 10% of the total storage space of the security chip. In this embodiment of the disclosure, the total storage space of the security chip refers to a storage space related to digital currency transactions. When the available storage space of the security chip is less than the preset threshold, that is, when the available storage space of the security chip is less than 10% of the total storage space, the security chip may send prompt information about updating the digital currency online and/or limiting a transaction frequency to the application or the terminal by means of the first communication module.

In this example, when the available storage space of the security chip is less than 10% of the total storage space, it indicates that the confidential information that has been stored in the security chip occupies a large space. While the transaction of the digital currency inevitably generates corresponding transaction information, and the digital currency itself occupies a corresponding storage space; and if the transaction frequency is not limited, the security chip may not be able to store the digital currency and the corresponding transaction information during continuous transaction, resulting in reduction of the security and success rate of transactions. Therefore, in this embodiment of the disclosure, when the available storage space of the security chip is less than the preset threshold, prompt information about limiting the transaction frequency is sent.

It is understandable that, the limited transaction frequency corresponding to the prompt information is related to the preset threshold, the space occupied by the digital currency, and the storage space required for the transaction information. For example, assuming that the space occupied by each digital currency needs to be 400 bytes when the preset threshold is 500 bytes, and the space correspondingly occupied by other transaction information needs to be 200 bytes, and it indicates that, when the available storage space of the security chip is less than the preset threshold, if a transaction is continued, the security chip is unable to store the digital currency in a process of a next transaction, and the limited transaction frequency is 0, that is, the transaction is limited to not continue, so as to guarantee the security and success rate of digital transactions.

In addition, when the storage space of the security chip is less than the preset threshold, the prompt information about updating the digital currency online may also be outputted. Therefore, when the user of the application or the terminal updates the digital currency online according to the prompt information, a plurality of digital currencies may be combined into one digital currency of the corresponding denomination according to the plurality of digital currencies stored in the security chip and the corresponding transaction information. For example, a digital currency A with the denomination being 10, a digital currency B with the denomination being 20, and a digital currency C with the denomination being 30 are stored in the security chip. When online update is performed, the three digital currencies may be updated into one digital currency with the denomination being 60 by means of the currency management apparatus corresponding to the application or the terminal. Therefore, by prompting the user to perform online update, the plurality of digital currencies stored in the security chip are combined into one digital currency, such that the available storage space of the security chip is increased, thereby facilitating the success of subsequent transactions.

In addition, when the prompt information about updating the digital currency and/or limiting the transaction frequency is issued according to the available storage space of the security chip, the prompt information may be issued by means of the following manners.

Implementation I: an upper limit of the transaction frequencies (for example, an upper limit of collection frequencies and/or an upper limit of payment frequencies) is preset according to a total storage space of the security chip; and after each transaction succeeds, the prompt information is issued according to the remaining transaction frequencies (the difference between the upper limit of the transaction frequencies and a total frequency of transactions that have been performed). It is understandable that, the total storage space here is the storage space related to digital currency transactions in the security chip.

Implementation II: the total frequency of the remaining transactions that may be performed (for example, a total frequency of remaining collections and/or a total frequency of remaining payments) is determined according to the available storage space of the security chip, and after each subsequent transaction succeeds, the prompt information is issued according to the frequency of the remaining transactions that may be performed. The available storage space here refers to the remaining storage space, which is related to the digital currency, in the security chip with the proceeding of digital currency transactions. The available storage space may be less than or equal to the total storage space of the security chip.

Implementation III: when the available storage space is less than the preset threshold, for example, the preset threshold is 100K, if the current available storage space is 100K, or the current available storage space is only 90K, the prompt information about updating the digital currency online and/or limiting the transaction frequency is issued.

It may be seen, from the security chip for digital currency storage according to the embodiments of the disclosure, that the confidential information related to the digital currency is stored by means of the storage module of the security chip, and the confidential information is sent to the application or the terminal when an information request sent by the application or the terminal using the digital currency for transactions is received, such that the confidential information related to the digital currency is safely stored, and the security of the confidential information is guaranteed, thereby improving security during digital currency transactions.

Figure 33:
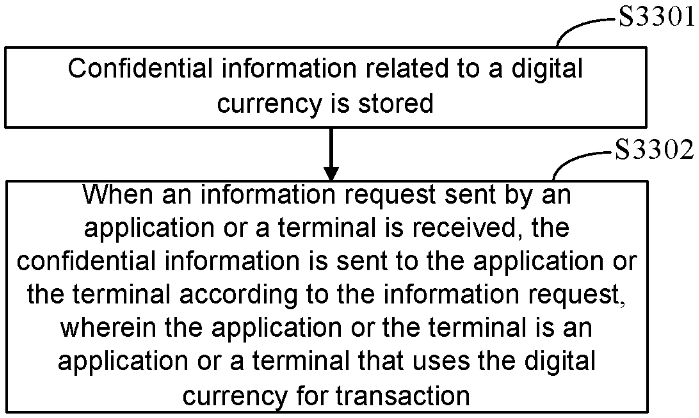
FIG. 33 is a schematic diagram of main steps of an application method for a security chip for digital currency storage according to an embodiment of the disclosure.

FIG. 33 is a schematic diagram of main steps of an application method for a security chip for digital currency storage according to an embodiment of the disclosure.

As shown in FIG. 33, the application method for a security chip for digital currency storage according to an embodiment of the disclosure may include the following steps.

At S3301, confidential information related to a digital currency is stored.

At S3302, when an information request sent by an application or a terminal is received, the confidential information is sent to the application or the terminal according to the information request. The application or the terminal is an application or a terminal that uses the digital currency for transaction.

In an embodiment of the disclosure, the confidential information includes any one or more of the following: a private key and a public key of a first user corresponding to the terminal, a public key of a second user specified by the first user, a public key of a currency management apparatus, a digital currency, identifier information of the digital currency, a transaction frequency threshold of the digital currency, an offline duration threshold of the digital currency, a payment key of the first user, a payment limit of the first user, state information of the application, identifier information of the application, and identifier information of the terminal.

In an embodiment of the disclosure, a security chip may determine a storage state of the confidential information according to a confidentiality level of the confidential information, and store the confidential information according to the storage state. The storage state indicates whether the confidential information is visible to the user.

It may be seen, from the application method for a security chip for digital currency storage according to the embodiments of the disclosure, that the confidential information related to the digital currency is stored by means of the storage module of the security chip, and the confidential information is sent to the application or the terminal when an information request sent by the application or the terminal using the digital currency for transactions is received, such that the confidential information related to the digital currency is safely stored, and the security of the confidential information is guaranteed, thereby improving security during digital currency transactions.

Figure 34:
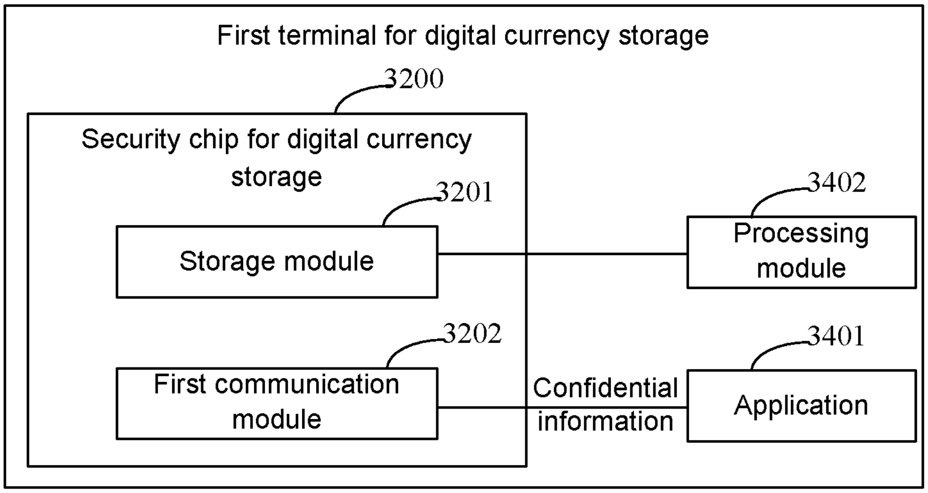
FIG. 34 is a schematic diagram of main modules of a first terminal for digital currency storage according to an embodiment of the disclosure.

FIG. 34 is a schematic diagram of main modules of a first terminal for digital currency storage according to an embodiment of the disclosure.

As shown in FIG. 34, the first terminal for digital currency storage according to an embodiment of the disclosure includes an application 3401 using a digital currency for transaction, and the security chip 3200 provided in any one of the above embodiments.

The security chip 3200 is configured to store confidential information related to the digital currency.

The application 3401 is configured to send an information request to the security chip 3200 when a transaction request related to the digital currency is received, so as to acquire, from the security chip 3200 according to the information request, the confidential information related to the digital currency.

The security chip 3200 is provided in the first terminal in the form of an all terminal, a Subscriber Identity Module (SIM) card, a Secure Digital (SD) card, an Integrated Circuit (IC) chip, a Standard Image Format (SIF) or Pilot Symbol Assisted Modulation (PSAM) card. The first terminal body may establish a connection with the security chip by means of a Single Wire Protocol (SWP) interface or an internal interface; and the application establishes a connection with the security chip by means of an Open Mobile Alliance (OMA) channel. The first terminal body may call the application by means of a system calling command (for example, OS-API).

The security chip may store the confidential information according to the confidentiality level of the information. The confidentiality level may be determined by a currency management apparatus corresponding to the first terminal. After determining the confidentiality level of the information related to the digital currency, the currency management apparatus sends the information related to the digital currency and the confidentiality level to the first terminal, so as to enable the first terminal to store the confidential information according to the confidentiality level of the information. In an embodiment of the method, the first terminal further includes a processing module 3402. The processing module 3402 is configured to: receive a confidentiality level of information related to the digital currency and sent by a currency management apparatus; and according to the confidentiality level, determine, from the information, the confidential information that is storable in the security chip, and store the confidential information in the security chip.

When the security chip stores the confidential information, the confidential information may be stored into the security chip according to storage states corresponding to different confidentiality levels. For example, the information related to the digital currency is classified into three confidentiality levels; and a first level is the highest level of confidentiality. The corresponding confidential information is stored in the security chip in the storage state that is invisible to the user. For example, the private key and the public key of the first user, and the public key of the second user specified by the first user all belong to the first level. A second level is lower in confidentiality level compared with the first level. The corresponding confidential information is stored in the security chip in the storage state that is visible to the user. For example, the digital currency, the identifier information of the digital currency, the transaction frequency threshold of the digital currency, and the offline duration threshold of the digital currency all belong to the second level. A third level is the lowest level of confidentiality. The corresponding information may not be stored in the security chip, for example, the identifier information of the user (a login name of the user), the available balance of the digital currency, etc.

In addition, the processing module may further determine a security level of the security chip, and then determine, according to the security level of the security chip, a transaction amount threshold related to the digital currency. For example, when the security level of the security chip is higher, the corresponding transaction amount threshold is greater. That is to say, in each transaction, the amount of the digital currencies that are allowed to be traded is greater. The security level of the security chip may be customized and configured in advance according to service requirements, for example, the security chips of different forms are configured to respectively correspond to different security levels.

In addition, in an embodiment of the disclosure, the application 3401 is further configured to verify the transaction request according to the confidential information, and determine, according to a verification result, whether to execute a transaction corresponding to the transaction request.

The application using the digital currency for transaction may be a wallet for managing the digital currency in the first terminal. When receiving the transaction request related to the digital currency and sent by a second terminal, the application 3401 may acquire the corresponding confidential information from the security chip, so as to verify, according to the confidential information, transaction information indicated by the transaction request, and then determine, according to the verification result, whether a transaction corresponding to the transaction request is executed.

For example, the transaction request may be automatically generated when the second terminal (payer) performs a transaction. For example, when a second user corresponding to the second terminal wants to use the digital currency to transfer accounts to a first user (payee) corresponding to the first terminal, the transaction request corresponding to the transfer transaction may be generated. The transaction information not only indicates the transaction information such as the transaction amount, the transaction identifier and the transaction time, but also indicates the digital currency to be traded. When the transaction information is information that is encrypted by using a private key of the second terminal, the first terminal may acquire, from the security chip, a public key of the second user corresponding to the second terminal; the transaction information is decrypted by using the public key of the second user, so as to obtain decrypted transaction information, and the decrypted transaction information is verified, so as to determine whether the digital currency indicated by the transaction request is credible; and when the digital currency is credible, the transaction corresponding to the transaction request may be executed according to the verification result, that is to say, the first terminal may transact with the second terminal according to the verification result.

For another example, the digital currency generally includes a signature that is generated by the corresponding currency management apparatus according to a private key of the currency management apparatus, and when the first terminal prepares for a transaction, a public key of the currency management apparatus may be acquired from the security chip, so as to verify the digital currency indicated by the transaction request; and when it is verified that the digital currency is credible, the transaction is performed with the second terminal according to the credible digital currency.

In addition, when the first terminal acts as the payer, the application may further be configured to encrypt, according to the confidential information, transaction information indicated by the transaction request, and send the encrypted transaction information to the second terminal indicated by the transaction request.

For example, the transaction is still performed between the first terminal and the second terminal, in this embodiment, the first terminal is the payer, and the second terminal is the payee. The first terminal may first acquire the private key of the first user from the security chip, sign the corresponding transaction information by using the private key of the first user, and then send the signed transaction information to the second terminal. The second terminal may acquire the public key of the first user from the security chip, and then verify the received transaction information by using the public key of the first user. When verification is passed, it indicates that the digital currency is credible, and the second terminal may transact with the first terminal.

It may be seen, from the first terminal for digital currency storage according to the embodiments of the disclosure, that the confidential information related to the digital currency is stored by means of the security chip in the first terminal; when the application in the first terminal receives the transaction request, the corresponding confidential information may be acquired from the security chip, and the transaction request is verified by using the confidential information; and then whether the transaction corresponding to the transaction request is determined according to the verification result. Therefore, the confidential information related to the digital currency is safely stored by means of the security chip, and the application in the first terminal may acquire the confidential information during transactions by means of access control of the security chip, such that the security of the confidential information is guaranteed, thereby improving the security during digital currency transactions.

Figure 35:
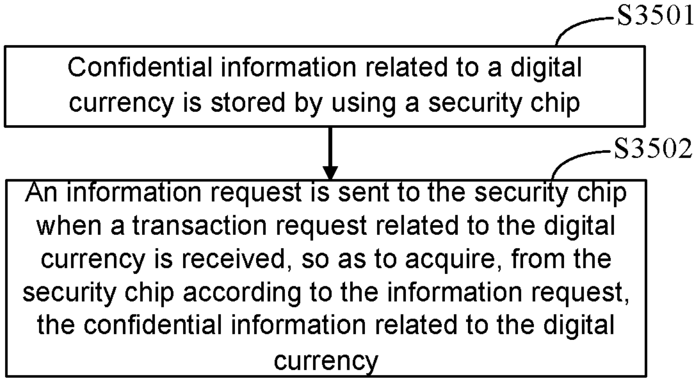
FIG. 35 is a schematic diagram of main steps of an application method for a first terminal for digital currency storage according to an embodiment of the disclosure.

FIG. 35 is a schematic diagram of main steps of an application method for a first terminal for digital currency storage according to an embodiment of the disclosure.

As shown in FIG. 35, the application method for a first terminal for digital currency storage according to an embodiment of the disclosure may include the following steps.

At S3501, confidential information related to a digital currency is stored by using a security chip.

At S3502, an information request is sent to the security chip when a transaction request related to the digital currency is received, so as to acquire, from the security chip according to the information request, the confidential information related to the digital currency.

In an embodiment of the disclosure, the step of storing the confidential information related to the digital currency by using the security chip includes: receiving a confidentiality level of information related to the digital currency and sent by a currency management apparatus; and according to the confidentiality level, determining, from the information, the confidential information that is storable in the security chip, and storing the confidential information in the security chip.

In an embodiment of the disclosure, the application in the first terminal may further be configured to verify the transaction request according to the confidential information, and determine, according to a verification result, whether to execute a transaction corresponding to the transaction request.

In an embodiment of the disclosure, the application in the first terminal may further encrypt, according to the confidential information, transaction information indicated by the transaction request, and send the encrypted transaction information to a second terminal indicated by the transaction request.

It may be seen, from the application method for a first terminal for digital currency storage according to the embodiments of the disclosure, that the confidential information related to the digital currency is stored by means of the security chip in the first terminal; when the application in the first terminal receives the transaction request, the corresponding confidential information may be acquired from the security chip, and the transaction request is verified by using the confidential information; and then whether the transaction corresponding to the transaction request is determined according to the verification result. Therefore, the confidential information related to the digital currency is safely stored by means of the security chip, and the application in the first terminal may acquire the confidential information during transactions by means of access control of the security chip, such that the security of the confidential information is guaranteed, thereby improving the security during digital currency transactions.

Figure 36:
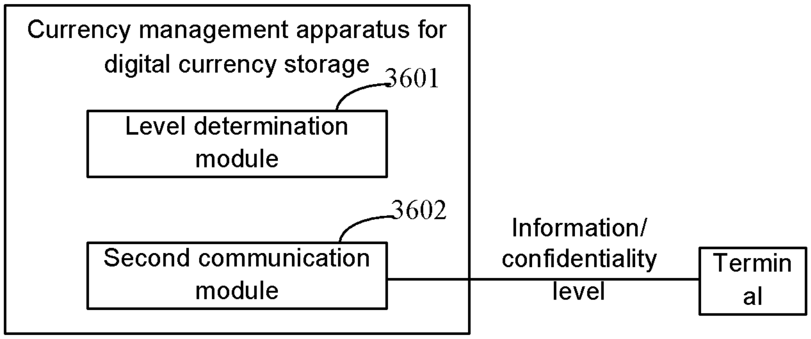
FIG. 36 is a schematic diagram of main modules of a currency management apparatus for digital currency storage according to an embodiment of the disclosure.

FIG. 36 is a schematic diagram of main modules of a currency management apparatus for digital currency storage according to an embodiment of the disclosure.

As shown in FIG. 36, currency management apparatus for digital currency storage in an embodiment of the disclosure includes a level determination module 3601 and a second communication module 3602.

The level determination module 3601 is configured to determine a confidentiality level of information related to a digital currency.

The second communication module 3602 is configured to send the information and the confidentiality level of the information to a terminal using the digital currency for transaction, so as to enable the terminal to determine confidential information according to the confidentiality level of the information, and store the confidential information into a security chip of the terminal.

Figure 37:
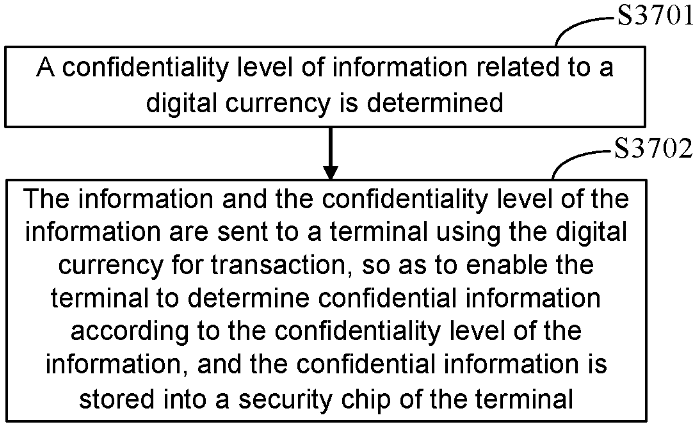
FIG. 37 is a schematic diagram of main steps of an application method for a currency management apparatus for digital currency storage according to an embodiment of the disclosure.

As shown in FIG. 37, an embodiment of the disclosure provides an application method for a currency management apparatus for digital currency storage. The method may include the following steps.

At S3701, a confidentiality level of information related to a digital currency is determined.

At S3702, the information and the confidentiality level of the information are sent to a terminal using the digital currency for transaction, so as to enable the terminal to determine confidential information according to the confidentiality level of the information, and the confidential information is stored into a security chip of the terminal.

The security chip may store the confidential information according to the confidentiality level of the information. The confidentiality level may be determined by a currency management apparatus corresponding to the first terminal. After determining the confidentiality level of the information related to the digital currency, the currency management apparatus sends the information related to the digital currency and the confidentiality level to the first terminal, so as to enable the first terminal to store the confidential information according to the confidentiality level of the information.

For example, the currency management apparatus may classify the information related to the digital currency into three confidentiality levels; and a first level is the highest level of confidentiality. The corresponding confidential information is stored in the security chip in the storage state that is invisible to the user. For example, the private key and the public key of the first user, and the public key of the second user specified by the first user all belong to the first level. A second level is lower in confidentiality level compared with the first level. The corresponding confidential information is stored in the security chip in the storage state that is visible to the user. For example, the digital currency, the identifier information of the digital currency, the transaction frequency threshold of the digital currency, and the offline duration threshold of the digital currency all belong to the second level. A third level is the lowest level of confidentiality. The corresponding information may not be stored in the security chip, for example, the identifier information of the user (a login name of the user), the available balance of the digital currency, etc.

Figure 38:
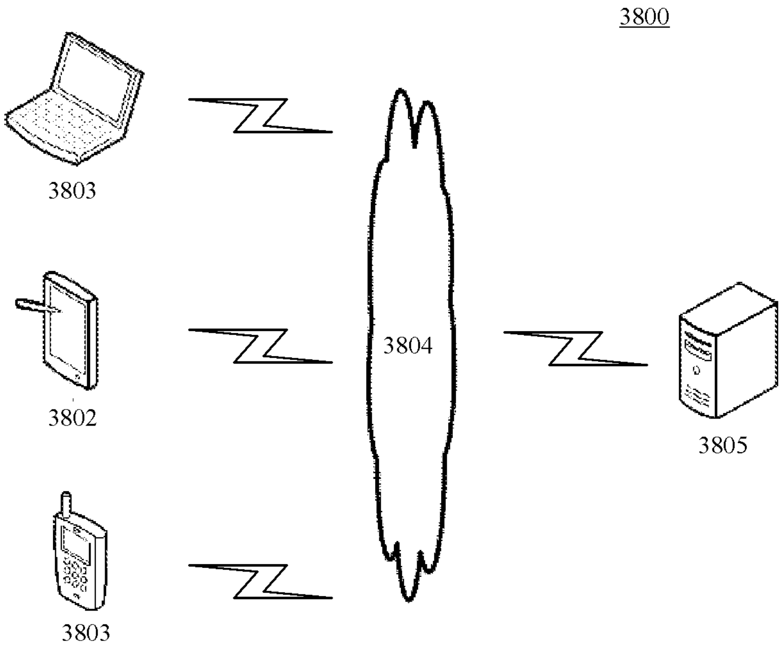
FIG. 38 is an architecture diagram of an exemplary system to which an embodiment of the disclosure may be applied.

FIG. 38 is an exemplary system architecture 3800 that may use the digital currency payment method according to the embodiments of the disclosure or a digital currency payment apparatus.

As shown in FIG. 38, a system architecture 3800 may include terminal devices 3801, 3802 and 3803, a network 3804 and a server 3805. The network 3804 is configured to provide a medium for communication links between the terminal devices 3801, 3802 and 3803 and the server 3805. The network 3804 may include various connection types, such as wired or wireless communication links, or fiber optic cables.

A user may use the terminal devices 3801, 3802 and 3803 to interact with the server 3805 by means of the network 3804, so as to receive or sent a message. Various communication client applications, such as shopping applications, web browser applications, search applications, instant messaging tools, email clients, social platform software, etc., may be installed on the terminal devices 3801, 3802 and 3803.

The terminal devices 3801, 3802 and 3803 may be a variety of electronic devices having a display screen and supporting web browsing, including, but is not limited to, smartphones, tablets, laptops, desktops, and the like.

The server 3805 may be a server that provides various services, for example, a background management server that provides support for shopping websites browsed by the user by means of the terminal devices 3801, 3802 and 3803. The background management server may perform analysis and other processing on received data, such as a product information query request, and feed back a processing result to the terminal device.

It is to be noted that the digital currency payment method provided in the embodiments of the disclosure is generally executed by the server 3805, and accordingly, the digital currency payment apparatus is generally provided in the server 3805.

It should be understood that, the number of the terminal devices, the networks and the servers in FIG. 38 is merely schematic. According to an implementation requirement, the terminal device, the network and the server may be in any number.

Figure 39:
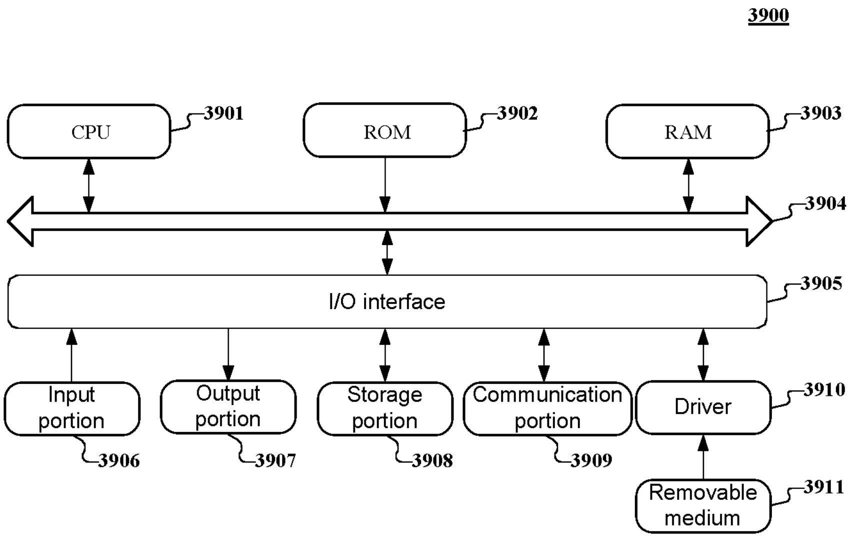
FIG. 39 is a schematic structural diagram of a computer system of a terminal device or a server that adapts to implement the embodiments of the disclosure.

FIG. 39 is a schematic structural diagram of a computer system 1900 of a terminal device that adapts to implement the embodiments of the disclosure. The terminal device shown in FIG. 39 is only an example, and should not impose any limitations on the functionality and scope of use of embodiments of the disclosure.

As shown in FIG. 39, the computer system 3900 includes a Central Processing Unit (CPU) 3901. The CPU may perform various appropriate actions and processing operations according to a program stored in a Read-Only Memory (ROM) 3902 or a computer program loaded from a storage portion 3908 into a Random Access Memory (RAM) 3903. In the RAM 3903, various programs and data required for the operation of the system 3900 may also be stored. The CPU 3901, the ROM 3902, and the RAM 3903 are connected to each other by means of a bus 3904. An Input/Output (I/O) interface 3905 is also connected to the bus 3904.

The following components are connected to the I/O interface 3905: an input portion 3906 including a keyboard, a mouse, etc.; an output portion 3907 including a Cathode Ray Tube (CRT), a Liquid Crystal Display (LCD), a speaker, etc.; a storage portion 3908 including a hard disk, etc.; and a communication portion 3909 including a network interface card such as a Local Area Network (LAN) card and a modem. The communication portion 3909 performs communication processing via a network such as Internet. A driver 3910 is also connected to the I/O interface 3905 as needed. A removable medium 3911, such as a magnetic disk, an optical disk, a magneto-optical disk, and a semiconductor memory, is installed on the driver 3910 as needed, such that a computer program read therefrom is installed into the storage portion 3908 as needed.

In particular, the process described above with reference to a flowchart may be implemented as a computer software program according to the disclosed embodiments of the disclosure. For example, the disclosed embodiments of the disclosure include a computer program product including a computer program carried on a computer-readable medium, and the computer program includes a program code for executing the method shown in the flowchart. In such an embodiment, the computer program may be downloaded and installed from the network via the communication portion 3909, and/or from the removable medium 3911. The computer program is executed by the CPU 3901 to execute the functions limited in the system of the disclosure.

It is to be noted that, the computer-readable medium shown in the disclosure may be a computer-readable signal medium or a computer-readable storage medium or any combination thereof. The computer-readable storage medium, for example, may be, but not limited to, an electrical, magnetic, optical, electromagnetic, infrared, or semiconductor system, apparatus or device, or a combination of any of the above. More specific examples of the computer-readable storage medium may include, but are not limited to, an electrical connection member including one or more wires, a portable computer disk, a hard disk, an RAM, an ROM, an Erasable Programmable Read-Only Memory (EPROM), a flash memory, optical fiber, a portable Compact Disc Read-Only Memory (CD-ROM), an optical storage device, a magnetic storage device, or any appropriate combination thereof. In the disclosure, the computer-readable storage medium may be any tangible medium that includes or stores a program. The program may be used by or in combination with an instruction execution system, an apparatus, or a device. In the disclosure, the computer-readable signal medium may include a data signal that is propagated in a base band or propagated as a part of a carrier wave, which carries a computer-readable program code therein. The propagated data signal may adopt a plurality of forms including, but not limited to, an electromagnetic signal, an optical signal, or any suitable combination of the above. The computer-readable signal medium may also be any computer-readable medium other than the computer-readable storage medium. The computer-readable medium may send, propagate or transmit the program that is used by or in combination with the instruction execution system, the apparatus, or the device. The program code in the computer-readable medium may be transmitted with any proper medium, including, but not limited to, radio, a wire, an optical cable, Radio Frequency (RF), etc., or any proper combination thereof.

The flowcharts and block diagrams in the drawings illustrate probably implemented system architectures, functions, and operations of the system, method, and computer program product according to various embodiments of the disclosure. On this aspect, each block in the flowcharts or block diagrams may represent a module, a program segment, or a portion of a code, which includes one or more executable instructions for implementing the specified logic functions. It is also to be noted that, in certain alternative implementations, the functions marked in the blocks may also be realized in a sequence different from those marked in the drawings. For example, two blocks shown in succession may, in fact, be executed substantially in parallel, and sometimes in a reverse sequence, depending upon the functionality involved. It is further to be noted that, each block in the block diagrams or the flowcharts and a combination of the blocks in the block diagrams or the flowcharts may be implemented by a dedicated hardware-based system configured to execute a specified function or operation, or may be implemented by a combination of special hardware and a computer instruction.

The modules described in the embodiments of the disclosure may be implemented by means of software or hardware. The modules described may also be provided in a processor, for example, a processor may be described as including a transaction amount acquisition module and a payment request sending module. The names of the modules do not constitute a limitation on the module itself in some cases, for example, the transaction amount acquisition module may also be described as "a module configured to generate a transaction amount, or acquire, by means of a communication connection between a first client and a second client, the transaction amount sent by the second client".

As another aspect, the disclosure further provides a computer-readable medium, which may be included in the device described in the above embodiments, or may also be present separately and not fitted into the device. The above computer-readable medium carries one or more programs. When the one or more above programs are executed by the device, the device is enabled to include: generating a transaction amount, or acquiring, by means of a communication connection between a first client and a second client, the transaction amount sent by the second client; and sending a payment request to the second client by means of the communication connection, where the payment request indicates a first digital currency corresponding to the transaction amount or a circulation identifier of the first digital currency, so as to enable a second currency management apparatus corresponding to the second client to cash a second digital currency corresponding to the transaction amount to a first currency management apparatus corresponding to the first client.

The above computer-readable medium carries one or more programs. When the one or more above programs are executed by the device, the device is enabled to include: establishing the communication connection between the first client and the second client; generating the transaction amount or receiving, by means of the communication connection, the transaction amount sent by the second client; determining whether the transaction amount is greater than a threshold amount, and when the transaction amount is greater than the threshold amount, acquiring a payment code corresponding to the transaction amount; and sending a payment request to the second client by means of the communication connection. The payment request indicates a first digital currency for payments or a circulation identifier of the first digital currency. When the transaction amount is greater than a threshold amount, the payment request further indicates the payment code, so as to enable a second currency management apparatus corresponding to the second client to cash a second digital currency corresponding to the first digital currency to a first currency management apparatus corresponding to the first client.

The above computer-readable medium carries one or more programs. When the one or more above programs are executed by the device, the device is enabled to include: storing confidential information related to the digital currency; and when an information request sent by an application or a terminal is received, sending the confidential information to the application or the terminal according to the information request. The application or the terminal is an application or a terminal that uses the digital currency for transaction.

According to the technical solutions of the embodiments of the disclosure, the first digital currency for payments or the identifier of the first digital currency is transferred by means of the communication connection between the first client and the second client, so as to enable the second client to cash the second digital currency corresponding to the first digital currency to the second currency management apparatus corresponding to the second client, such that online payment of the digital currency and circulation between different clients are realized, and the disclosure is convenient and fast.

According to the technical solutions of the embodiments of the disclosure, the first digital currency for payments or the identifier of the first digital currency is transferred by means of the communication connection between the first client and the second client, so as to enable the second client to cash the second digital currency corresponding to the first digital currency to the second currency management apparatus corresponding to the second client, such that online payment of the digital currency and circulation between different clients are realized, and the disclosure is convenient and fast. In addition, the security of the digital currency during large payment transactions is guaranteed by setting the payment code when the transaction amount is greater than the threshold amount. In order to avoid the influence of disconnection on the communication connection during acquisition of the payment code, the normal operation of the payment transaction is guaranteed by re-establishing the communication connection corresponding to the payment transaction.

According to the technical solutions of the embodiments of the disclosure, the confidential information related to the digital currency is stored by means of the storage module of the security chip, and the confidential information is sent to the application or the terminal when an information request sent by the application or the terminal using the digital currency for transactions is received, such that the confidential information related to the digital currency is safely stored, and the security of the confidential information is guaranteed, thereby improving security during digital currency transactions.

The foregoing specific implementations do not constitute limitations on the scope of protection of the disclosure. Those skilled in the art should understand that, various modifications, combinations, sub-combinations and substitutions may be made according to design requirements and other factors. Any modifications, equivalent replacements, improvements and the like made within the spirit and principle of this application shall fall within the scope of protection of the disclosure.

What is claimed is:

1. An application method for a security chip for digital currency storage, comprising:

a currency management apparatus corresponding to the security chip determining a confidentiality level of information related to a digital currency;

the currency management apparatus sending the information and the confidentiality level of information to a terminal where the security chip is located;

the terminal determining, according to the confidentiality level to the information, confidential information that is storable in the security chip;

the security chip storing the confidential information;

the security chip receiving an information request sent by an application on the terminal;

in response to the information request, the security chip sending the confidential information to the application on the terminal, wherein the terminal uses the digital currency for a transaction;

the application on the terminal receiving a transaction request;

the application on the terminal verifying the transaction request according to the confidential information, and determining, according to a verification result, whether to execute a transaction corresponding to the transaction request, wherein the confidential information comprises a transaction frequency threshold of the digital currency and an offline duration threshold of the digital currency, when a transaction frequency of the digital currency is less than the transaction frequency threshold, the transaction is allowed to be executed, and when an offline duration of the digital currency is less than the offline duration threshold, the transaction is allowed to be executed;

when an available storage space of the security chip is less than a preset threshold, the security chip sending prompt information about updating the digital currency online and/or limiting a transaction frequency to the application or the terminal, wherein the preset threshold is determined according to a total storage space of the security chip;

when the security chip sending the prompt information about updating the digital currency online to the application of the terminal, combining a plurality of digital currencies into one digital currency of a corresponding denomination according to the plurality of digital currencies stored in the security chip and corresponding transaction information;

wherein combining a plurality of digital currencies into one digital currency of a corresponding denomination according to the plurality of digital currencies stored in the security chip and corresponding transaction information comprises: updating, in the security chip, the plurality of digital currencies into one digital currency of a corresponding denomination according to the plurality of digital currencies stored in the security chip and corresponding transaction information.

2. The method as claimed in claim 1, wherein the security chip storing the confidential information comprises:

the terminal determining a storage state of the confidential information according to a confidentiality level of the confidential information; and the security chip storing the confidential information according to the storage state, wherein the storage state indicates whether the confidential information is visible to a user.

3. The method as claimed in claim 1, wherein the confidential information comprises any one or more of the following: a private key and a public key of a first user corresponding to the terminal, a public key of a second user specified by the first user, a public key of a currency management apparatus, a digital currency, identifier information of the digital currency, a payment key of the first user, a payment limit of the first user, state information of the application, identifier information of the application, and identifier information of the terminal.

4. A security chip for digital currency storage, comprising:

one or more processors; and a storage apparatus, configured to store one or more programs, wherein when the one or more programs are executed by the one or more processors, the one or more processors are enabled to implement the following actions:

a currency management apparatus corresponding to the security chip determining a confidentiality level of information related to a digital currency;

the currency management apparatus sending the information and the confidentiality level of information to a terminal where the security chip is located;

the terminal determining, according to the confidentiality level to the information, confidential information that is storable in the security chip;

the security chip storing confidential information; and the security chip receiving an information request sent by an application on the terminal;

in response to the information request, the security chip sending the confidential information to the application on the terminal, wherein the terminal uses the digital currency for a transaction;

the application on the terminal receiving a transaction request;

the application on the terminal verifying the transaction request according to the confidential information, and determining, according to a verification result, whether to execute a transaction corresponding to the transaction request, wherein the confidential information comprises a transaction frequency threshold of the digital currency and an offline duration threshold of the digital currency, when a transaction frequency of the digital currency is less than the transaction frequency threshold, the transaction is allowed to be executed, and when an offline duration of the digital currency is less than the offline duration threshold, the transaction is allowed to be executed;

when an available storage space of the security chip is less than a preset threshold, the security chip sending prompt information about updating the digital currency online and/or limiting a transaction frequency to the application or the terminal, wherein the preset threshold is determined according to a total storage space of the security chip;

when the security chip sending the prompt information about updating the digital currency online to the application or the terminal, combining a plurality of digital currencies into one digital currency of a corresponding denomination according to the plurality of digital currencies stored in the security chip and corresponding transaction information;

wherein the combining a plurality of digital currencies into one digital currency of a corresponding denomination according to the plurality of digital currencies stored in the security chip and corresponding transaction information comprises: updating, in the security chip, the plurality of digital currencies into one digital currency of a corresponding denomination according to the plurality of digital currencies stored in the security chip and corresponding transaction information.

5. The security chip for digital currency storage as claimed in claim 4, wherein the security chip storing the confidential information related to the digital currency comprises:

the terminal determining a storage state of the confidential information according to a confidentiality level of the confidential information; and the security chip storing the confidential information according to the storage state, wherein the storage state indicates whether the confidential information is visible to a user.

6. The security chip for digital currency storage as claimed in claim 4, wherein the confidential information comprises any one or more of the following: a private key and a public key of a first user corresponding to the terminal, a public key of a second user specified by the first user, a public key of a currency management apparatus, a digital currency, identifier information of the digital currency, a payment key of the first user, a payment limit of the first user, state information of the application, identifier information of the application, and identifier information of the terminal.

* * * * *